United States Patent [19]

Hayamizu et al.

[11] Patent Number: 4,731,621

[45] Date of Patent: Mar. 15, 1988

[54] RECORDING APPARATUS HAVING PRINTING HEAD

[75] Inventors: Mamoru Hayamizu, Chiba; Ichiro Sano, Kawasaki; Toshiaki Sakai, Tokyo, all of Japan

[73] Assignees: Kabushiki Kaisha Toshiba, Kawasaki; Soartec Corporation, Tokyo, both of Japan

[21] Appl. No.: 29,775

[22] Filed: Mar. 24, 1987

[30] Foreign Application Priority Data

| | | | |
|---|---|---|---|
| Mar. 25, 1986 | [JP] | Japan | 61-64819 |
| Apr. 9, 1986 | [JP] | Japan | 61-80164 |
| May 21, 1986 | [JP] | Japan | 61-114900 |
| Nov. 14, 1986 | [JP] | Japan | 61-269791 |

[51] Int. Cl.[4] .......... G01D 15/16; G01D 15/10

[52] U.S. Cl. .......... 346/140 R; 346/76 PH

[58] Field of Search .......... 346/140 R, 140 PD, 76 PH, 346/75; 400/126

[56] References Cited

U.S. PATENT DOCUMENTS 4,652,893 3/1987 Suyuki et al. .......... 346/140 PD

FOREIGN PATENT DOCUMENTS 60-71260 4/1985 Japan .

*Primary Examiner*—E. A. Goldberg
*Assistant Examiner*—Linda M. Peco
*Attorney, Agent, or Firm*—Schwartz, Jeffery, Schwaab, Mack, Blumenthal & Evans

[57] ABSTRACT

A recording apparatus having a printing head, comprises a support having heating elements, a film being contacted the support to face the elements and having nozzle holes on a region facing the elements, an ink holder, arranged near the holes and on one of opposing surfaces of the film and the support, for holding externally supplied ink, and a vibrator for vibrating the support to supply ink to the holes from the ink holder through a gap between the opposing surfaces of the film and the support.

In another embodiment a drive unit may reciprocally move the nozzle member in the alignment direction. In a further embodiment the drive unit may reciprocally move the film and spacer relative to the support and the ink supplier.

28 Claims, 45 Drawing Figures

RECORDING APPARATUS HAVING PRINTING HEAD

BACKGROUND OF THE INVENTION

The present invention relates to a recording apparatus using an ink-jet type printing head.

Various conventional ink-jet type printing heads are known. However, in any type of the printing head, a single nozzle is combined with a single ink injection means. Therefore, if a nozzle clogs, ink cannot be injected toward a recording paper sheet, and desired patterns such as characters, numerals, or other symbols cannot be perfectly printed on the recording paper sheet. In particular, when a heating means is used as the ink injection means, ink is injected from an injection port of the nozzle by means of bubbles formed in the ink in the nozzle upon heating of the heating means. However, if the ink cannot be supplied to the heating means due to clogging of the nozzle, the heating means is idly operated, and may be damaged. When the heating means is damaged, since the heating means is arranged integrally with the nozzle, the printing head as a whole must be replaced.

When a combination of one nozzle and one ink injection means is applied to the manufacture of a line printer head which requires a large number of nozzles arranged at high density, a large number of ink injection means must also be arranged at high density in correspondence to the large number of nozzles. However, an alignment operation for realizing such an arrangement is very difficult to attain. Therefore, an ink-jet type line printer head in which the nozzles and the ink injection means have one-to-one correspondence has not yet been placed on the market.

Japanese Patent Disclosure (Kokai) No. 60-71260 discloses a recording apparatus having an ink-jet type printing head which can be used as a line printer head.

The recording apparatus having the ink-jet type printing head described in the above disclosure comprises ink tank 12 for storing a large quantity of ink, rotating roller 14 which is rotated inside ink tank 12, and heating means support member 16 arranged above ink tank 12, as shown in FIG. 45. A large number of heating means 18 are arranged on the upper surface of heating means support member 16 along a line perpendicular to the sheet surface. Endless film member 20 is looped between rotating roller 14 and heating means support member 16, and a large number of nozzle areas 24 each consisting of a large number of nozzle holes 22, arranged along a line perpendicular to the sheet surface, are formed on endless film member 20 at equal intervals along the longitudinal direction thereof.

Ink is filled in nozzle holes 22 of film member 20 which is driven by roller 14 when member 20 passes through ink tank 12. The ink filled in nozzle holes 22 is injected therefrom by the pressure of bubbles formed upon heating of heating means 18 when nozzle area 24 to which these holes belong is located above heating means 18 of heating means support member 16. The injected ink droplets become attached to recording paper sheet 26 which is fed near the upper surface of heating means support member 16. When corresponding heating means 18 in nozzle areas 24 are heated while recording paper sheet 26 is moved in a given direction, a desired pattern can be printed on recording paper sheet 26.

In the conventional recording apparatus having the above arrangement, ink also becomes attached to the surface of film member 20 because it is difficult to accurately maintain a predetermined distance (preferable, 0.2 mm) between film member 20 on support member 16 and recording paper sheet 26. Therefore, paper sheet 26 often contacts film member 20, and is contaminated with ink attached to film member 20. In the conventional recording apparatus, nozzle areas 24 moving out from ink tank 12 are exposed to air until they reach support member 16. Therefore, the ink filled in nozzle holes 22 of nozzle areas 24 is dried and becomes attached to inside of nozzle holes 22, thereby easily clogging the nozzles.

The above problems interfere with the practical application of the above-mentioned recording apparatus.

In the recording apparatus described in Japanese Patent Disclosure No. 60-71260, since a diameter of each nozzle hole 22 is small, a sufficient printing density cannot be obtained only by ink injected from nozzle holes 22. In order to increase the printing density, a contact angle of film member 20 with respect to the upper surface of support member 16 is decreased (about 2 to 6 degrees), the spray angle of ink injected from nozzle holes 22 is increased, and clear printing cannot be performed. If a diameter of each nozzle hole 22 is increased, although the printing density is increased, a resolution is decreased, and, again, clear printing cannot be performed.

If a double printing operation is performed in order to improve the printing density and to attain clear printing, a printing speed is decreased to half, and a resolution is also degraded as compared to a single printing operation. In addition, the service life of heating means 18 is also decreased to half.

SUMMARY OF THE INVENTION

The present invention has been made in consideration of the above situation, and has as its object to provide a recording apparatus having a simple ink-jet type printing head, which can be used as a line printer head, can perform clear printing, and allows to separately replace nozzles and ink injection means.

It is a detailed first object of the present invention to provide a structure which does not cause clogging of ink in nozzles, and, when a heating means is used as an ink injection means, can prevent a trouble due to idle heating of the heating means caused by clogging of ink, in order to cause a recording apparatus having an ink-jet type printing head which can be used as a line printer head to perform clear printing.

It is a detailed second object of the present invention to provide a structure which does not cause clogging of ink in nozzles, and can maintain an appropriate distance between a recording paper sheet and corresponding injection holes of nozzles arranged at a position corresponding to an ink injection means of a printing head so as to prevent ink on the recording paper sheet from being blurred and to obtain an appropriate resolution, in order to cause a recording apparatus having an ink-jet type printing head which can be used as a line printer head to perform clear printing.

It is a detailed third object of the present invention to provide a structure in which ink is injected a plurality of times from nozzles which are arranged at high density to obtain high resolution without moving the nozzle positions, so that a printing density can be improved without impairing resolution, and the service life of the ink injection means will not be shortened, in order to cause a recording apparatus having an ink-jet type printing head which can be used as a line printer head to perform clear printing.

The detailed first object of the present invention can be achieved by a recording apparatus having a printing head, comprising: a heating means support member having a plurality of heating means; a film member which is in contact with the heating means support member to face the plurality of heating means and has a plurality of nozzle holes on a region facing the heating means; an ink holding portion, arranged near the plurality of nozzle holes and on one of opposing surfaces of the film member and the heating means support member, for holding externally supplied ink; and vibration generating means for vibrating the heating means support member to supply ink to the plurality of nozzle holes from the ink holding portion through a gap between the opposing surfaces of the film member and the heating means support member.

The detailed first object of the present invention can also be achieved by a recording apparatus having a printing head, comprising: a heating means support member having a plurality of heating means which are aligned in line; a nozzle member which is in contact with the heating means support member to face the plurality of heating means, has a plurality of nozzle grooves, which are open to its end face, on a region facing the heating means, and is movable in the alignment direction of the plurality of heating means; nozzle member drive means for reciprocally moving the nozzle member in the alignment direction; and ink supply means for supplying ink to the plurality of nozzle grooves.

The detailed second object of the present invention can be achieved by a recording apparatus having a printing head, comprising: a heating means support member having a plurality of heating means; a film member which is in contact with the heating means support member to face the plurality of heating means, and has a plurality of nozzle holes on a region facing the heating means; a spacer member which is in contact with the film member on a side opposite to the heating means support member, is arranged near the plurality of heating means of the heating means support member, and has a predetermined thickness; reciprocal drive means for reciprocally moving the film member and the spacer member relative to the heating means support member; and ink supply means for supplying ink to the plurality of nozzle holes of the film member, and wherein the reciprocal drive means reciprocally moves the film member and the spacer member relative to the heating means support member, so as to reliably supply ink from the ink supply means to all of the plurality of nozzle holes of the film member, the plurality of heating means are selectively heated during the reciprocal movement, and ink injected from the plurality of nozzle holes corresponding to the selected heating means is caused to become attached to a recording paper sheet, which is in contact with the spacer member and is separated from the surface of the film member by a predetermined distance by the spacer member, thereby performing a printing operation.

The detailed third object of the present invention can be achieved by a recording apparatus having a printing head, comprising: a heating means support member having a plurality of heating means; a film member which is in contact with the heating means support member to face the plurality of heating means, and has a plurality of nozzle holes on a region facing the heating means; a spacer member which is in contact with the film member on a side opposite to the heating means support member, is arranged near the plurality of heating means of the heating means support member, and has a predetermined thickness; reciprocal drive means for reciprocally moving the film member and the spacer member relative to the heating means support member; ink supply means for supplying ink to a gap between the film member and the heating means support member; and ink storage means for storing the ink supplied from the ink supply means in the gap.

DETAILED DESCRIPTION OF THE PREFERRED EMBODIMENTS

Various embodiments of the present invention will be described hereinafter with reference to the accompanying drawings.

Figure 1:
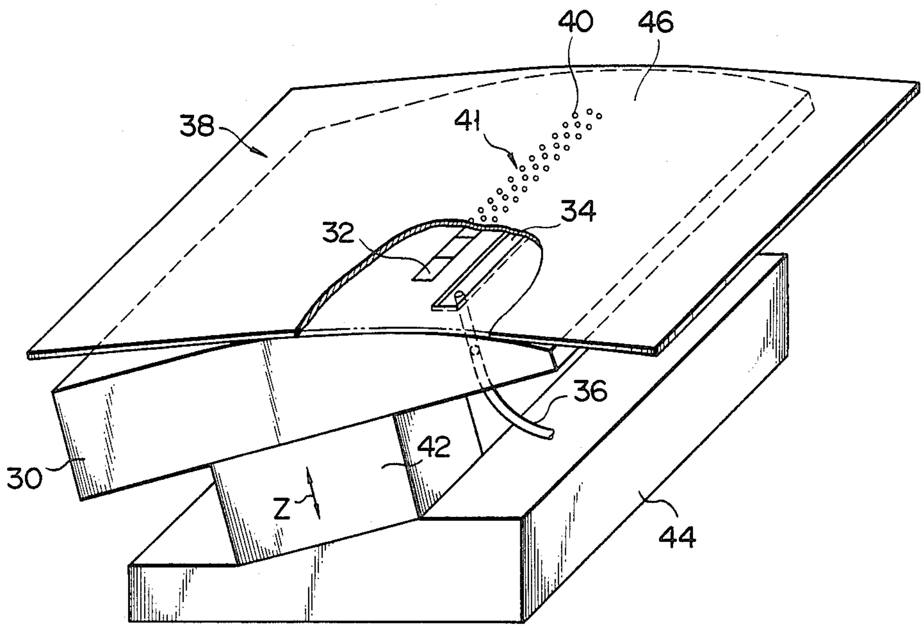
FIG. 1 is a perspective view schematically showing a first embodiment of a printing head used in a recording apparatus capable of achieving the detailed first object of the present invention.
Figure 2:
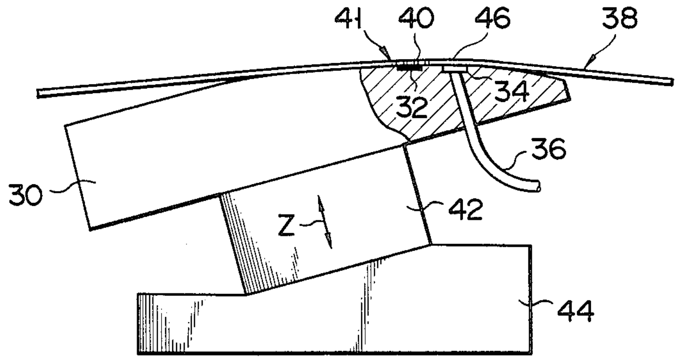
FIG. 2 is a partially cutaway side view schematically showing the printing head shown in FIG. 1.

FIGS. 1 and 2 show a first embodiment that can achieve the detailed first object of the present invention.

In FIGS. 1 and 2, reference numeral 30 denotes a heating means support member, having a large number of heating means 32. Heating means 32 are arranged on the upper surface of support member 30 and along an extending line in the widthwise direction of the upper surface of support member 30.

Recess portion 34 is formed on the upper surface of support member 30 near heating means 32 to extend along an aligning direction of a plurality of heating means 32. One end of ink supply pipe 36 is coupled to recess portion 34, and the other end of pipe 36 is coupled to an external ink supply source (not shown). Ink supplied from the external ink supply source into recess portion 34 through pipe 36 is held in recess portion 34. Therefore, recess portion 34 serves as an ink holding portion.

Film member 38 which consists of a metal or polyimide having a heat resistance and an elasticity is brought into contact with the upper surface of support member 30 to face heating means 32. A large number of nozzle holes 40 are formed on heating-means corresponding areas of film member 38. These nozzle holes 40 are arranged along the aligning direction of heating means 32, and constitute single nozzle group 41. The plurality of nozzle holes 40 correspond to each of a plurality of heating means 32.

Vibration generating means 42 consisting of piezoelectric ceramics, which is resonated by a signal at a predetermined frequency supplied from a signal supply source (not shown), is coupled to the lower surface of support member 30, and applies a vibration in a direction indicated by arrow Z in FIG. 1 to support member 30.

Vibration generating means 42 is supported by base 44.

In the first embodiment with the above arrangement, when support member 30 is vibrated by vibration generating means 42, ink in ink holding portion 34 is continuously supplied to a large number of nozzle holes 40 via a small gap (not shown) between film member 38 and support member 30.

When a print signal is supplied from a print circuit (not shown) to a large number of heating means 32 while support member 30 is vibrated, a predetermined number of heating means 32 corresponding to the print signal are instantaneously heated, and bubbles are formed in ink inside nozzle holes 40 corresponding to individual heating means 32 upon heating of heating means 32. When bubbles are formed in nozzle holes 40, the ink filled therein is injected, and becomes attached to a recording paper sheet (not shown) which is separated upward from nozzle group 41 by a small distance (about 0.2 mm). The recording paper sheet is fed in a direction perpendicular to the aligning direction of a plurality of heating means 32, and various print signals are supplied thereto, so that desired patterns such as characters, numerals and other symbols corresponding to combinations of the various print signals can be printed on the recording paper sheet.

In this case, a negative pressure state that occurs after bubbles and ink in nozzle holes 40 are injected also contributes to ink supply from ink holding portion 34 to nozzle holes 40.

In the above embodiment, ink holding portion 34 corresponds to region 46 of film member 38 on which no nozzle group 41 is formed. Therefore, when no printing operation is performed (i.e., when support member 30 is not vibrated), ink holding portion 34 is sealed by region 46, thus preventing ink in ink holding portion 34 from being dried.

Note that the area of nozzle group 41 is larger than a total area of a plurality of heating means 32 on support member 30.

Figure 3:
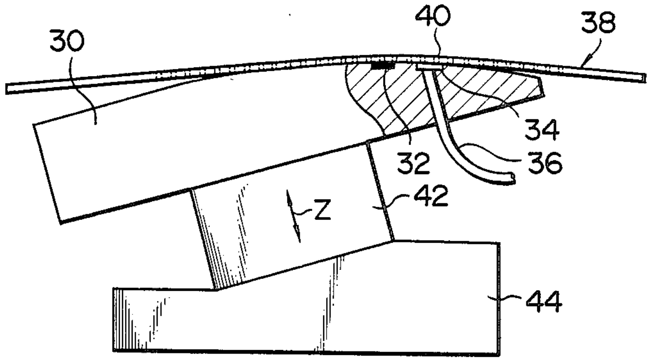
FIG. 3 is a partially cutaway side view schematically showing a second embodiment of a printing head used in a recording apparatus capable of achieving the detailed first object of the present invention.

FIG. 3 shows a second embodiment that can achieve the detailed first object of the present invention. In this embodiment, a large number of nozzle holes 40 are formed over the entire surface of film member 38. Other arrangements are the same as those in the first embodiment shown in FIG. 1. Therefore, the same reference numerals in FIG. 3 denote the same parts as in FIG. 1, and a detailed description thereof is omitted.

Figure 4:
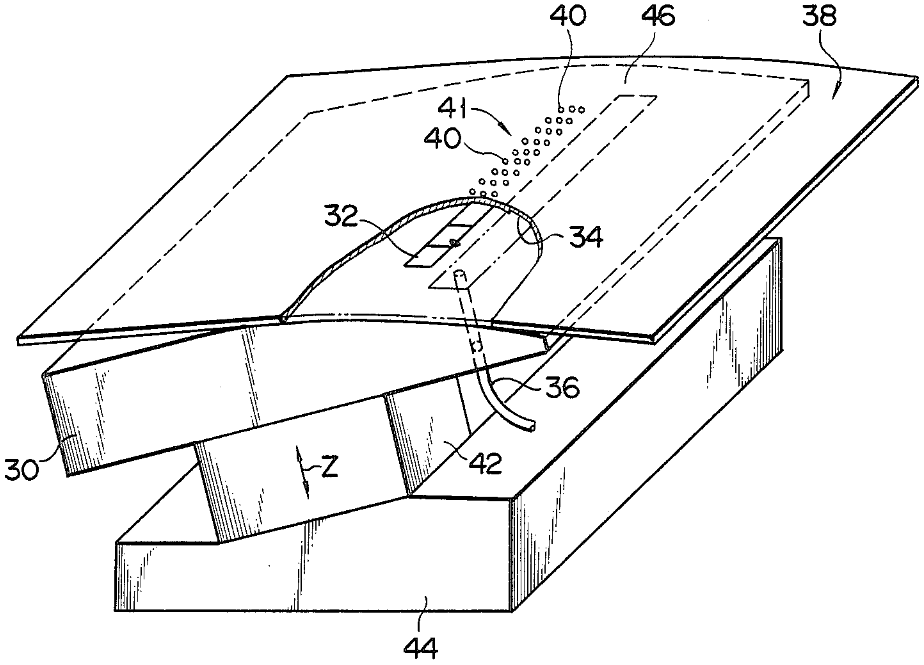
FIG. 4 is a perspective view schematically showing a third embodiment of a printing head used in a recording apparatus capable of achieving the detailed first object of the present invention.
Figure 5:
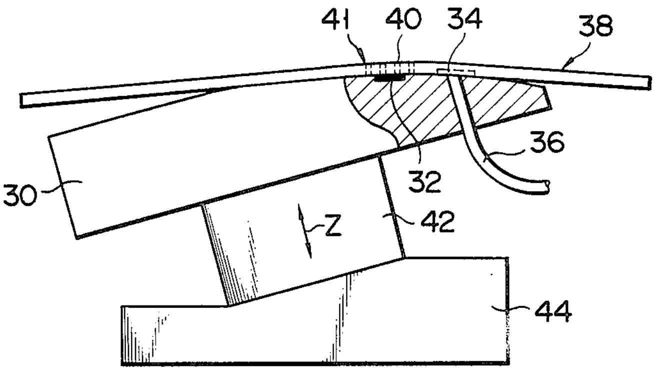
FIG. 5 is a partially cutaway side view schematically showing the printing head shown in FIG. 4.

FIGS. 4 and 5 show a third embodiment that can achieve the detailed first object of the present invention. In this embodiment, ink holding portion 34 is formed on the back surface of film member 38 to be separated from nozzle group 41. Other arrangements are the same as those in the first embodiment shown in FIGS. 1 and 2. Therefore, the same reference numerals in FIGS. 4 and 5 denote the same parts as in the first embodiment, and a detailed description thereof is omitted.

Figure 6:
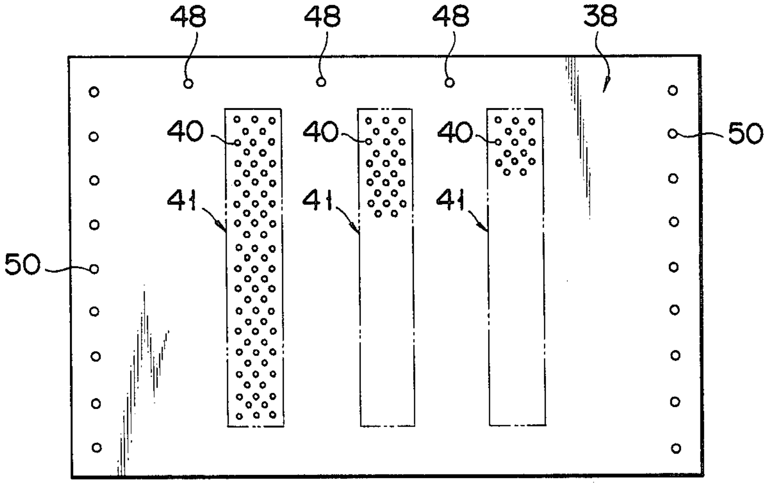
FIG. 6 is a plan view schematically showing a film member on which a large number of nozzle holes are formed in a fourth embodiment of the printing head used in the recording apparatus capable of achieving the detailed first object of the present invention.

FIG. 6 shows film member 38 used in a fourth embodiment, shown in FIG. 4, that can achieve the detailed first object of the present invention. In this embodiment, a plurality of nozzle groups 41 are formed on film member 38 at equal intervals to extend along a direction perpendicular to the longitudinal direction of member 38. Positioning holes 48 are formed near respective nozzle groups 41. A plurality of engaging holes 50 are formed on two end portions of film member 38, in a direction perpendicular to the longitudinal direction of nozzle groups 41, to be aligned along the longitudinal direction of the nozzle groups 41. In this embodiment, after one nozzle group 41 is used for a predetermined period of time, film member 38 is moved, so that nonused nozzle group 41 faces a plurality of heating means 32.

Figure 7:
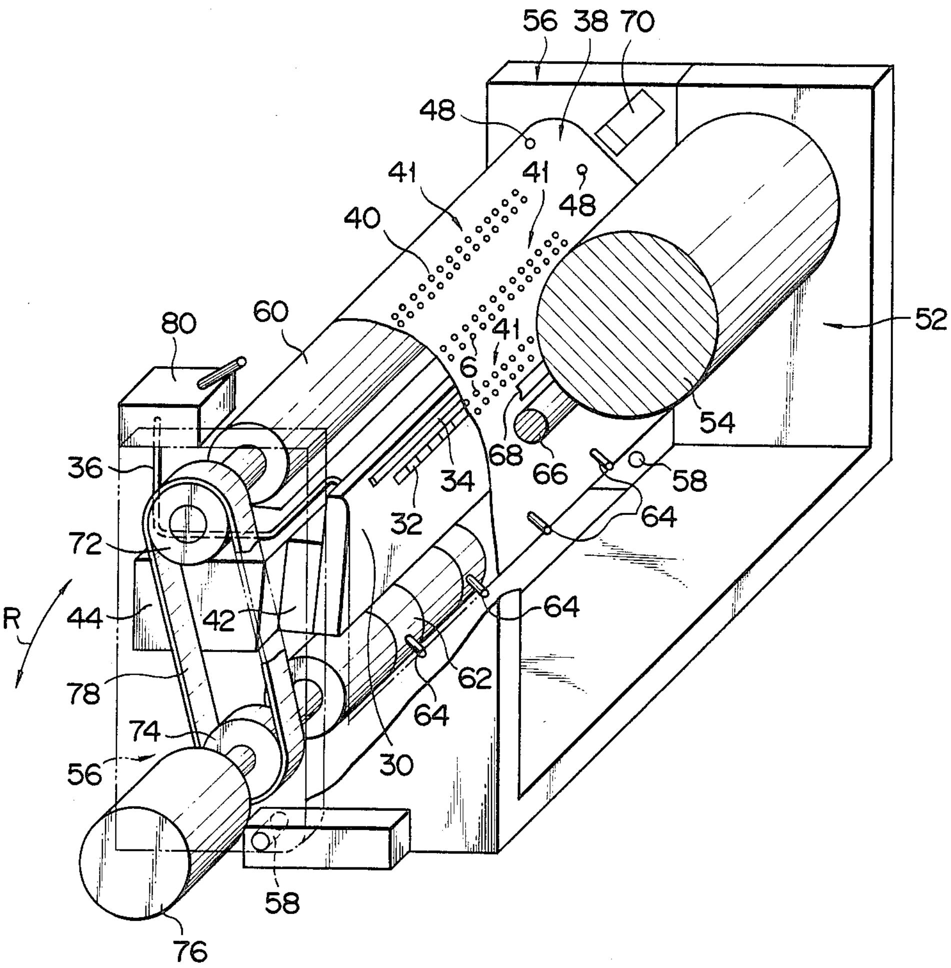
FIG. 7 is a partially cutaway perspective view schematically showing a recording apparatus comprising the printing head of the fourth embodiment using the film member shown in FIG. 6 and capable of achieving the detailed first object of the present invention.

The same reference numerals in the fourth embodiment shown in FIG. 7 denote the same parts as in the first embodiment shown in FIGS. 1 and 2, and a detailed description thereof is omitted. In FIG. 7, reference numeral 52 denotes a platen frame, on which platen 54 is rotatably arranged. Platen frame 52 is coupled to head frame 56 through pin 58. When head frame 56 is rotated about pin 58 in a direction indicated by double headed arrow R, it approaches or is separated from platen 54.

A pair of drums 60 and 62 for suspending film member 38 therebetween are arranged on head frame 56 to be parallel to platen 54. A plurality of engaging pins 64 projecting in the radial direction are fixed to the surfaces of drums 60 and 62. Pins 64 are inserted in engaging holes 50 formed on the two end portions of film member 38. One drum 62 is urged by a torsion spring (not shown) in one direction so as to suspend film member 38 between drums 60 and 62.

Paper feed pulley 66, which is rotatably arranged on platen frame 52, is arranged near platen 54. Spacer member 68, formed of a thin film, for obtaining an optimal gap between a recording paper sheet and film member 38 for satisfactory printing is interposed between platen 54 and film member 38. The recording paper sheet is urged against spacer member 68 between platen 54 and paper feed roller 66, thereby obtaining the above gap. Spacer member 68 is arranged at the upstream side of the moving direction of the recording paper sheet and near nozzle group 41 facing a plurality of heating means 32.

Hole detector 70 for detecting positioning holes 48 of film member 38 is arranged on one side wall of head frame 56.

Timing pulley 72, which is concentrically fixed to the central shaft of drum 60, motor 76, the output shaft of which is coupled to timing pulley 74, and timing belt 78 looped between a pair of timing pulleys 72 and 74 are arranged outside the other side wall of head frame 56. Drums 60 and 62 are rotated by motor 76 against the urging force of the torsion spring.

Ink tank 80 is arranged on head frame 56. The other end of ink supply pipe 36, one end of which is coupled to ink holding portion 34 on support member 30, is coupled to ink tank 80. Base 44 for vibration generating means 42 and support member 30 is held on head frame 56.

In the recording apparatus shown in FIG. 7, when film member 38 is replaced, head frame 56 is pivoted counterclockwise about pin 58. As a result, since support member 30 and drums 60 and 62 are separated apart from platen 54, film member 38 can be easily replaced through a large gap defined between support member 30, drums 60 and 62, and platen 54.

In the embodiments shown in FIGS. 1 to 7 of the recording apparatus comprising the printing head that can achieve the detailed first object of the present invention, ink in the ink holding portion formed near a large number of nozzle holes is continuously supplied to a large number of nozzle holes of the film member by means of vibration applied to the heating means support member. Therefore, the nozzle holes can be prevented from clogging.

Since a plurality of nozzle holes correspond to each heating means, even if one nozzle hole clogs, a blank dot (a portion on which no ink becomes attached) will not be formed in a pattern printed by the single heating means.

Since the film member has elasticity, it can be in satisfactory contact with the heating means support member. As a result, in a nonprint mode, ink leakage from the ink holding portion can be prevented.

This elasticity also contributes to easy replacement of the film member.

The heating means support member and the film member can be formed to be flat, and can have a simple structure. Therefore, this results in easy manufacture and low cost.

Since the printing head of the above embodiments is applied to a line printer head, the line printer head can be formed to be flat. Therefore, the printing head of the above embodiments is best suited for a high-speed color printer which must use a plurality of line printer heads.

Figure 8:
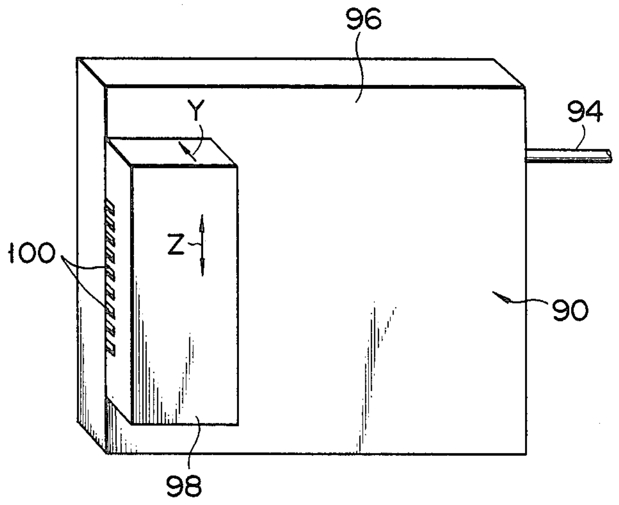
FIG. 8 is a perspective view schematically showing a printing head used in a fifth embodiment of a recording apparatus capable of achieving the detailed first object of the present invention.
Figure 9:
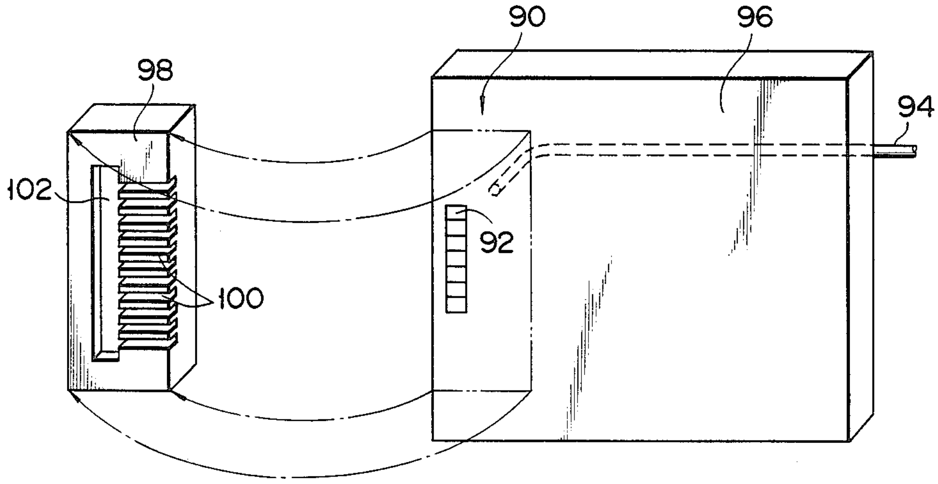
FIG. 9 is a perspective view schematically showing a state wherein a heating means support member and a nozzle member constituting the printing head shown in FIG. 8 are separated.

FIGS. 8 to 19 show a fifth embodiment that can achieve the detailed first object of the present invention. FIGS. 8 and 9 show printing head 90 used in a recording apparatus according to the fifth embodiment.

A plurality of heating means 92 are vertically arranged on one end portion of the side surface of printing head 90. Printing head 90 has rectangular flat heating means support member 96, which vertically stands. The other end of ink supply pipe 94, one end of which is coupled to an ink tank (not shown), is open to a portion of support member 96 near heating means 92.

Nozzle member 98 is in contact with the one side surface of support member 96 to cover a plurality of heating means 92 and the opening of ink supply pipe 94. Nozzle member 98 is movable in a vertical direction (indicated by arrow Z) relative to support member 96, is urged in a direction closer to one side surface of support member 96 (indicated by arrow Y). A plurality of nozzle grooves 100, which extend in the back-and-forth direction, are formed on a region facing heating means 92 of the surface of nozzle member 98 facing support member 96. Nozzle grooves 100 are open to the front end face of nozzle member 98, and the front end face of nozzle member 98 coincides with that of support member 96.

The number of nozzle grooves 100 is not same as that of heating means 92.

In this embodiment, the pitch between adjacent nozzle grooves 100 is 0.03 mm, and the width of each heating means 92 is 0.08 mm. Therefore, in this embodiment, one heating means 92 corresponds to three nozzle grooves 100. Recess portion 102, which extends in the vertical direction, is formed on the above-mentioned surface of nozzle member 98. Recess portion 102 faces the opening of ink supply pipe 94, and communicates with nozzle grooves 100. Ink supplied from ink supply pipe 94 into recess portion 102 is supplied to nozzle grooves 100. Recess portion 102 serves as an ink supply means for supplying ink to nozzle grooves 100.

Figure 10:
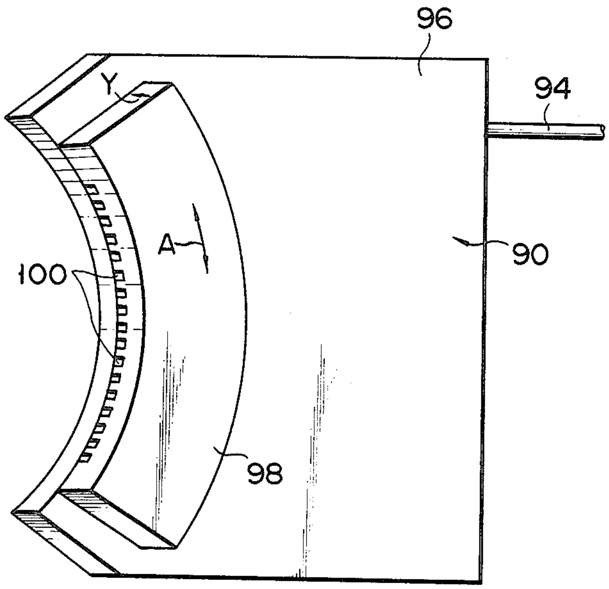
FIG. 10 is a perspective view schematically showing an improved printing head shown in FIG. 8.
Figure 11:
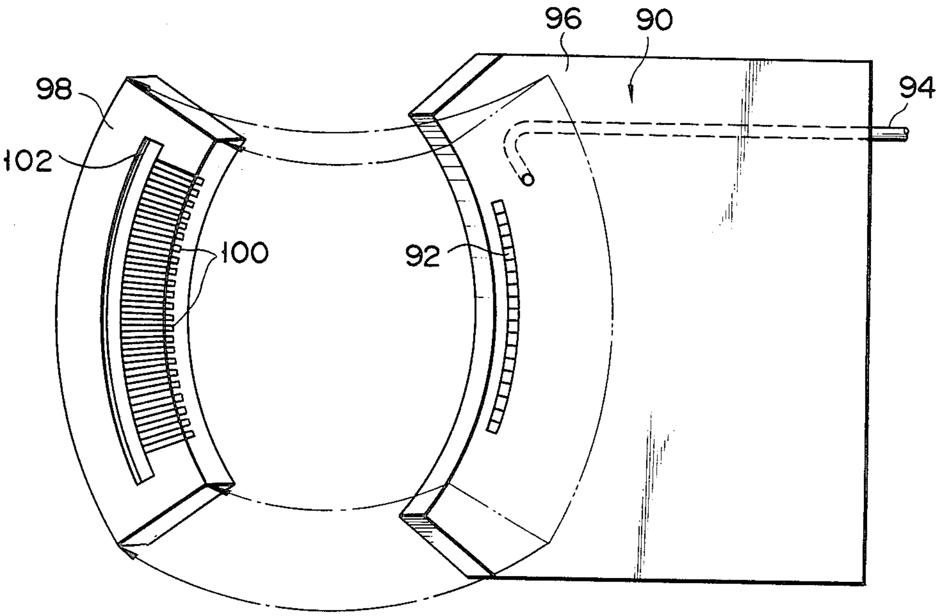
FIG. 11 is a perspective view schematically showing a state wherein a heating means support member and a nozzle member constituting the improved printing head shown in FIG. 10 are separated.

FIGS. 10 and 11 show an improvement of printing head 90 described above. In improved printing head 90, the front end face of nozzle member 98, to which a plurality of nozzle grooves 100 are open, and the front end face of heating means support member 96, which coincides with that of nozzle member 98, are arcuated inwardly along the outer peripheral surface of a platen (to be described later). Heating means 92 are arranged along the arcuated front end face of support member 96, and the recess portion of ink supply means 102 is also arcuated along the front end face of nozzle member 98. A plurality of nozzle grooves 100 are arranged radially from the front end face of nozzle member 98. Nozzle member 98 is movable along a curve indicated by arrow A. Printing head 90 having the above arrangement greatly contributes to high-speed printing.

Figure 12:
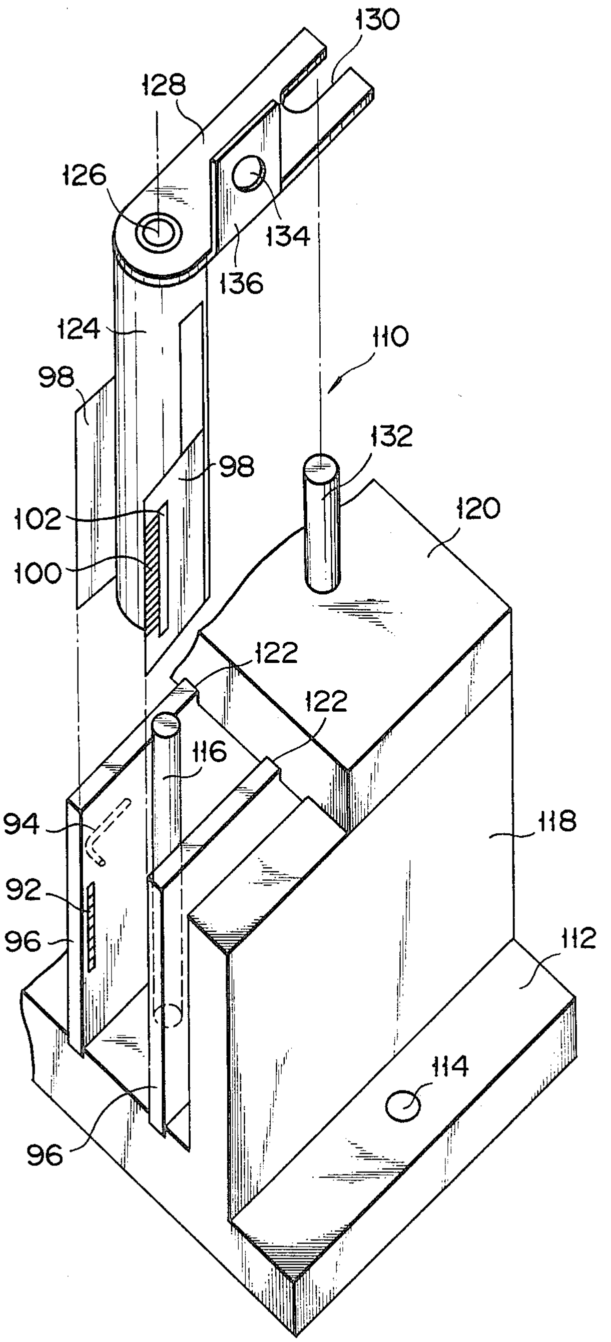
FIG. 12 is a partially exploded perspective view schematically showing a printing head unit for an actual recording apparatus, which is constituted by a pair of printing heads shown in FIGS. 8 and 9.

FIG. 12 shows printing head unit 110, for an actual recording apparatus, comprising a pair of printing heads 90 shown in FIGS. 8 and 9. The same reference numerals in FIG. 12 denote the same parts as in printing head 90 shown in FIGS. 8 and 9, and a detailed description thereof will be omitted.

Positioning hole 114, for mounting base 112 to a recording apparatus (to be described later), is formed on base 112 of printing head unit 110. A pair of heating means support members 96 are vertically fixed at the central portion of the upper surface of base 112 to be separated by a given distance. Each support member 96 has a plurality of heating means 92 at the front end portion facing the remaining support member. Heating means 92 are linearly aligned in the vertical direction. Ink supply pipe 94 is open to the surface of each support member 96 facing the remaining support member at a position near heating means 92 and further from the front end face than heating means 92. Guide rod 116, which projects in the vertical direction, is fixed on the upper surface of base 112 between a pair of support members 96. Vertical walls 118 are formed on the upper surface of base 112 at both sides of support members 96. Roof member 120 extends between the upper end faces of vertical walls 118. A pair of positioning grooves 112 are formed on the lower surface of roof member 120, and are fitted on the upper end portions of support members 96, thereby positioning support members 96 relative to each other.

Guide hole 126 of moving member 124, which vertically holds a pair of nozzle members 98 on its two side surfaces, is fitted on guide rod 116 to be slidable in the longitudinal direction of guide rod 116. Lock member 128, extending above roof member 120, is mounted integrally with the upper end of moving member 124. Lock pin 132 fixed on the upper surface of roof member 120 is fitted in lock groove 130 formed on the end portion of lock member 128 to be vertically slidable. Vertical tongue tip 136, having coupling hole 134, is formed on lock member 128.

Figure 13:
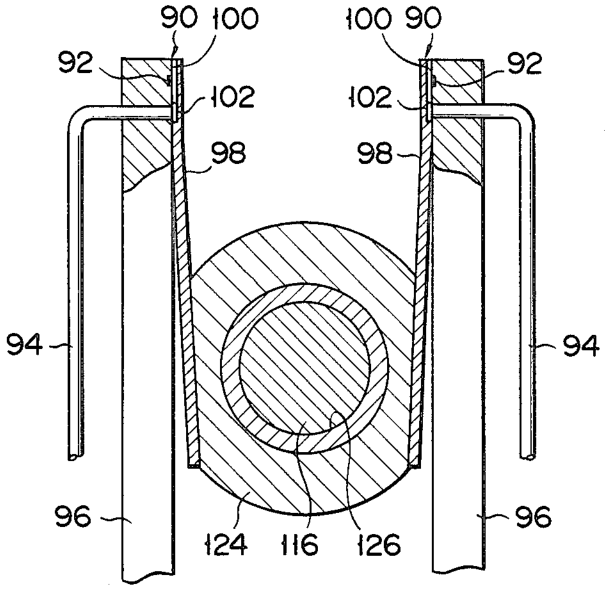
FIG. 13 is a horizontal sectional view schematically showing the arrangement of a pair of heating means support members and a pair of nozzle members in the printing head unit shown in FIG. 12.

In this embodiment, each nozzle member 98 is formed of a material having an elasticity to be flat. Nozzle members 98 are fixed to moving member 124 at their end portions (rear end portions) further from nozzle grooves 100, so that a distance between end portions (front end portions) on which nozzle grooves 100 are formed is larger than a distance between the opposing surfaces of support members 96. Therefore, when guide hole 126 of moving member 124 is fitted on guide rod 116, the front end portions of nozzle members 98 are pressed by the corresponding front end portions of the opposing surfaces of support members 96 by self-elasticity, as shown in FIG. 13. The front end faces of nozzle members 98 coincide with front end faces of support members 96, and nozzle grooves 100 and ink holding portions 102 of nozzle members 98 face heating means 92 and ink supply pipes 94 of corresponding support members 96.

Figure 14:
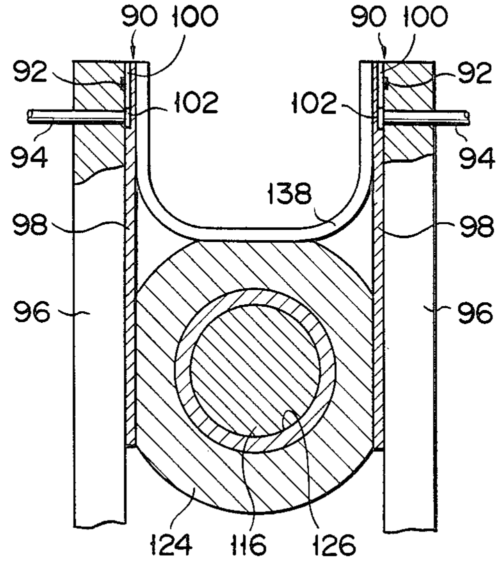
FIG. 14 is a horizontal sectional view schematically showing the same section as in FIG. 13 of a first modification of the printing head unit shown in FIG. 12.

FIG. 14 shows a first modification of printing head unit 110 shown in FIGS. 12 and 13. In the first modification, the rear end portions of a pair of nozzle members 98 are fixed to two side portions of moving member 124 to be parallel to the opposing surfaces of a pair of support members 96. The central portion of leaf spring 138, having a substantially U-shaped cross-section, is fixed to the front portion of moving member 124 by a known fixing means, e.g., spot welding. Two end portions of lead spring 138 urge the front end portions of nozzle members 98 against the front end portions of the opposing surfaces of support members 96.

Figure 15:
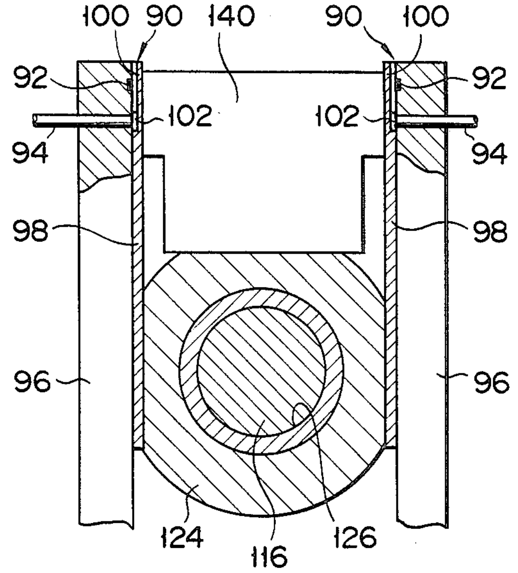
FIG. 15 is a horizontal sectional view schematically showing the same section as in FIG. 13 of a second modification of the printing head unit shown in FIG. 12.

FIG. 15 shows a second modification of printing head unit 110 shown in FIGS. 12 and 13. In this modification, urging member 140, which is formed of an elastic material such as rubber and is fixed to the front portion of moving member 124 by a known fixing means such as an adhesive, is used instead of U-shaped leaf spring 138. Urging member 140 urges the front end portions of nozzle members 98 against the front end portions of the opposing surfaces of support members 96.

Figure 16:
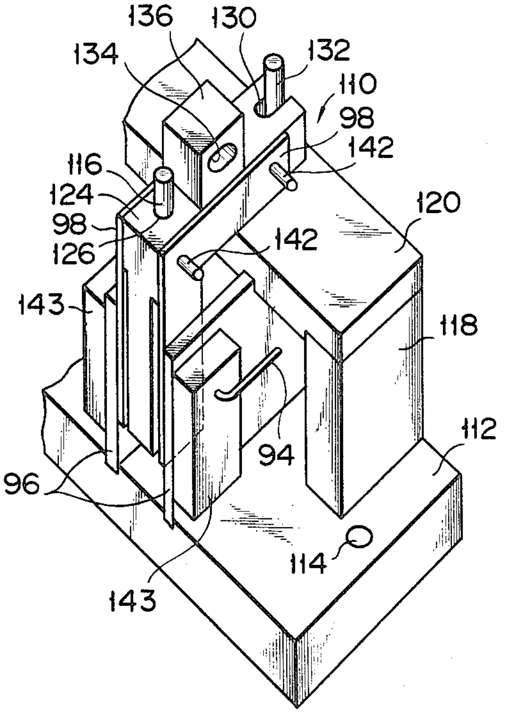
FIG. 16 is a perspective view schematically showing a third modification of the printing head unit shown in FIGS. 12 and 13.

FIG. 16 shows a third modification of printing head unit 110 shown in FIGS. 12 and 13. The same reference numerals in this modification denote the same parts as in FIGS. 12 and 13, and a detailed description thereof will be omitted. In this modification, moving member 124 has an inverted L shape consisting of an upper-side portion extending in the back-and-forth direction, and a downward extending portion extending downward from the front end of the lower surface of the upper-side portion. Lock groove 130 is formed on the rear end of the upper-side portion of moving member 124, and guide groove 126, in which guide rod 116 is slidably inserted, is formed on the downward extending portion. A plurality of guide pins 142 project from the two side surfaces of the upper-side portion of moving member 124. A pair of inverted L-shaped nozzle members 98, which extend along the two side surfaces of moving member 124, are engaged with guide pins 142 to be slidable in the longitudinal direction of guide pins 142. Magnets 143 are arranged on the front end portions of the outer side surfaces of support members 96. The downward extending portions of nozzle members 98 are urged against the front end portions of the opposing surfaces of corresponding support members 96, by the magnetic force of magnets 143.

Figure 17:
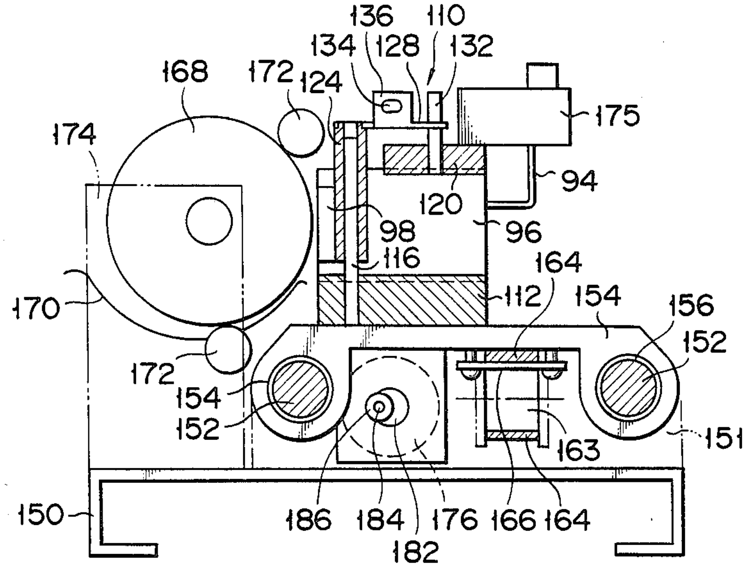
FIG. 17 is a cross-sectional view schematically showing a recording apparatus which uses two printing head units shown in FIGS. 12 and 13 and is capable of multicolor recoding using four colors.
Figure 18:
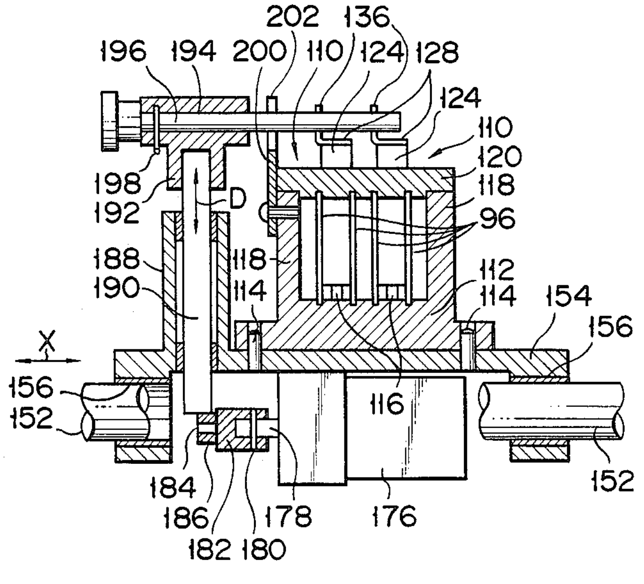
FIG. 18 is a longitudinal sectional view schematically showing the recording apparatus shown in FIG. 17.
Figure 19:
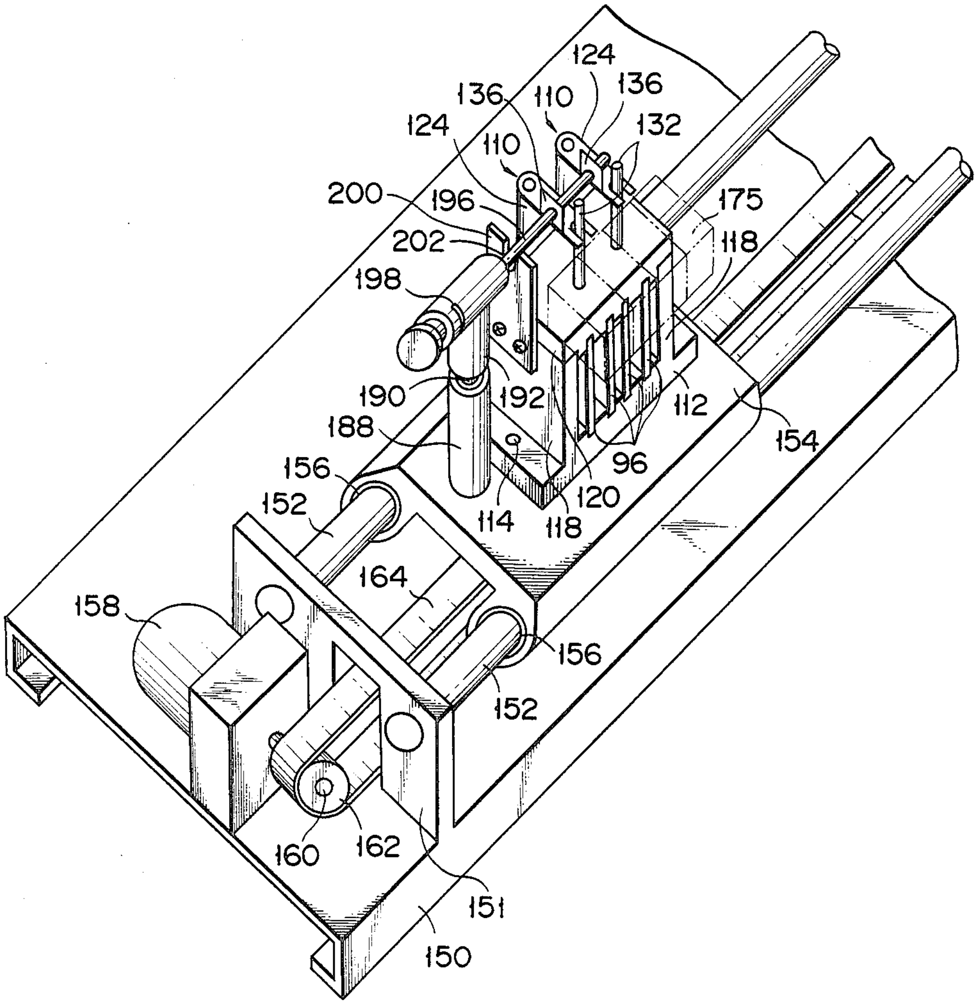
FIG. 19 is a perspective view schematically showing the recording apparatus shown in FIG. 17.

FIGS. 17 to 19 show a recording apparatus, which uses two printing head units 100 shown in FIG. 12, and is capable of multi-color printing, using four colors (black and three primary colors). Slidable frame 154 is arranged on a pair of stationary shafts 152, fixed to stationary frame 150, to be reciprocal in the longitudinal direction of stationary shafts 152 (a direction indicated by arrow X in FIG. 18) through slide bearing 156. Slidable frame 154 is fixed, by timing belt fixing member 166, to endless timing belt 164 which is looped between driving pulley 162 on output shaft 160 of driving motor 158 fixed on stationary frame 150, and free pulley 163 rotatably held on stationary frame 150, and which extends along stationary shafts 152 therebetween. Slidable frame 154 reciprocates along stationary shafts 152 upon rotation of output shaft 160 of driving motor 158.

Platen 168, paper guide 170, and a pair of platen rollers 172 are arranged above stationary frame 150 to be parallel to stationary shafts 152, as shown in FIG. 17, and are rotatably held by platen support wall 174 on stationary frame 150.

Base 112 for two printing head units 110 each having two printing heads 90 is fixed on slidable frame 154, and four printing heads 90 of two printing head units 110 face platen 168, as shown in FIG. 17. Upon reciprocal movement of slidable frame 154, two printing head units 110 also reciprocate along the longitudinal direction of platen 168. In this embodiment, four ink tanks 175 for the above-mentioned four colors, coupled to ink supply pipes 94, are mounted on the upper surface of roof member 120 for two printing head units 110.

Motor 176 is fixed to the lower surface of slidable frame 154, and eccentric member 182 is mounted on output shaft 178 of motor 176 through spring pin 180. Bearing 186 abuts against the lower end face of reciprocal shaft 190. Shaft 190 is fitted on eccentric shaft 184 on eccentric member 182, and is received by a bearing hole of bearing member 188 formed on slidable frame 154 so as to be reciprocal in a direction indicated by arrow D, as shown in FIG. 18. When eccentric member 182 is rotated by motor 176, reciprocal shaft 190 reciprocates in the vertical direction indicated by arrow D.

Horizontal rod support member 192 is fixed to the upper end of reciprocal shaft 190, and horizontal rod 196 is inserted in horizontal through hole 194 in support member 192 to be detachable by spring pin 198. Horizontal rod 196 extends through anti-rotation groove 202 of anti-rotation plate 200 mounted on vertical wall 118 of base 112 for printing head units 110, and through coupling holes 134 of vertical tongue tips 136 of two printing head units 110.

In the multi-color recording apparatus shown in FIGS. 17 to 19, when output shaft 178 of motor 176 is rotated, reciprocal shaft 190 and horizontal rod 196 are reciprocally moved in the vertical direction indicated by arrow D. As a result, nozzle members 98, which are supported by moving member 124 to which vertical tongue tips 136 are fixed, are vertically reciprocated with respect to corresponding heating means support members 96.

In the above embodiment, motor 176, eccentric plate 182, bearing 186, and reciprocal rod 190 constitute a reciprocal drive means for two printing head units 110. However, the reciprocal drive means can have another arrangement.

Figure 20:
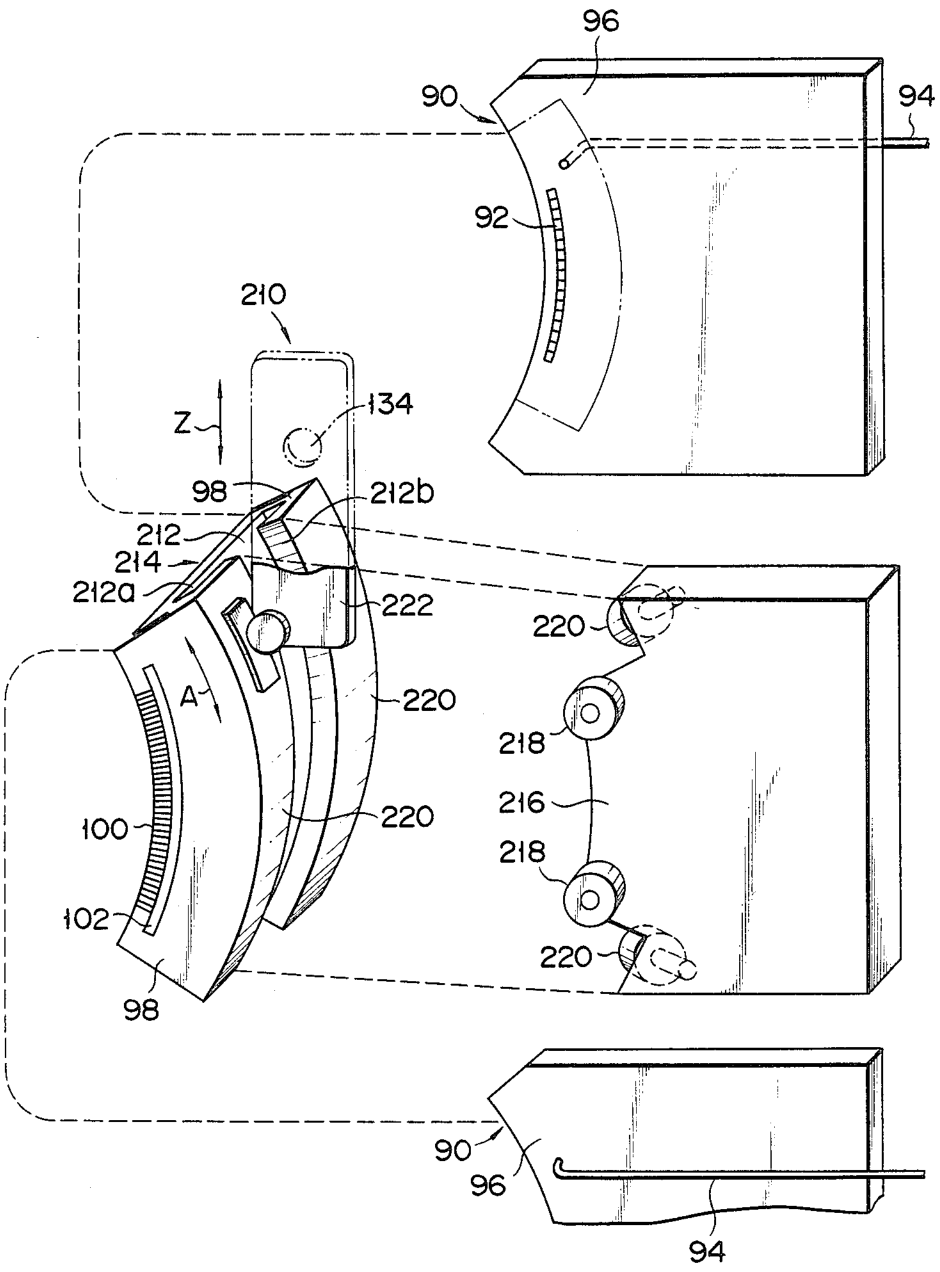
FIG. 20 is an exploded perspective view schematically showing a printing head unit constituted by two arcuated printing heads shown in FIGS. 10 and 11.
Figure 21:
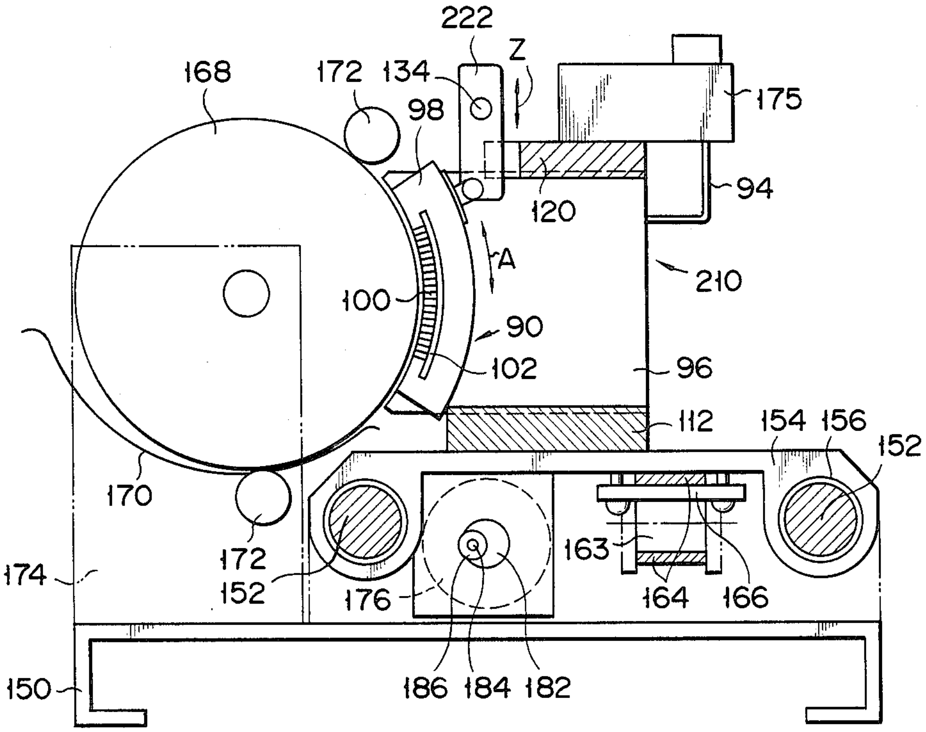
FIG. 21 is a cross-sectional view schematically showing the recording apparatus which uses two printing head units shown in FIG. 20 and is capable of multicolor recording using four colors.
Figure 22:
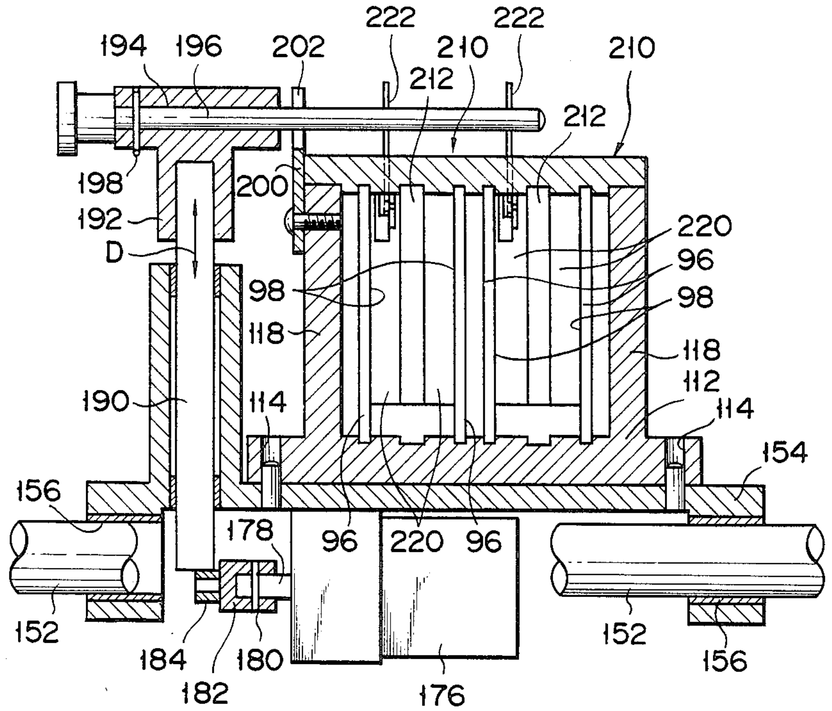
FIG. 22 is a longitudinal sectional view schematically showing the recording apparatus shown in FIG. 21.

FIGS. 20 to 22 show a recording apparatus which uses two printing head units 210 each having two arcuated printing heads 90 shown in FIGS. 10 and 11, and capable of multi-color printing using four colors (black and three primary colors).

FIG. 20 shows printing head unit 210 described above. The same reference numerals in FIG. 20 denote the same parts as in FIGS. 10 and 11, and a detailed description thereof will be omitted.

A pair of heating means support members 96 are arranged to vertically stand parallel to each other. plurality of heating means 92 and the openings of ink supply pipes 94 are respectively formed on the opposing surfaces of support members 96. A pair of nozzle members 98 are arranged in a gap between support members 96 to stand vertically and parallel to each other. Nozzle members 98 constitute a pair of printing heads 90 together with opposing support members 96. Nozzle members 98 are coupled to each other through arcuated moving member 214, which has guide groove 212 having a T-shaped cross-section. The rear end of guide groove 212 is open to the rear end face of moving member 214. Two pairs of guide rollers 218 and 220 are inserted in guide groove 212. Guide rollers 218 and 220 are rotatably held by guide plate 216, which vertically stands between support members 96.

In this case, one pair of guide rollers 218 abut against one 212a of a pair of large width portions (portions extending in the right-and-left direction) of guide groove 212, and the other pair of guide rollers 220 abut against one side surface 212b of a small width portion (portion extending in the back-and-forth direction) of guide groove 212. Vertical tongue tip 222 having coupling hole 134 is coupled to one of a pair of rear walls 220 of moving member 214 to be rotatable in the vertical plane.

Figure 25:
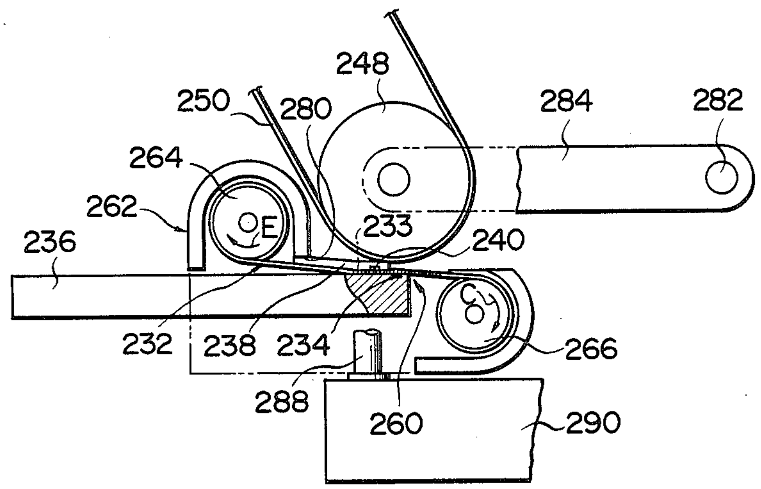
FIG. 25 is a cross-sectional view schematically showing a recording apparatus capable of achieving the detailed second object of the present invention, wherein a planar heating means support member of the printing head is adopted and has a flat upper surface.

Therefore, in the printing head unit 210 shown in FIG. 20, when vertical tongue tip 222 is reciprocally moved in the vertical direction indicated by arrow Z, nozzle members 98 can be reciprocally moved along a curve in a direction indicated by arrow A, relative to support members 96. A pair of printing head units 210 each comprising two printing heads 90 as described above are supported by base 112 for two printing head units 210, roof member 120, and horizontal rod 196 coupled to a reciprocal drive means, as shown in FIGS. 21 and 25, in the same manner as in the recording apparatus shown in FIGS. 17 to 19. The front end faces of four printing heads 90 of two printing head units 210 face the outer peripheral surface of platen 168 at a given small distance.

The operations of printing head 90 shown in FIGS. 8 and 9, improved printing head 90 shown in FIGS. 10 and 11, printing head unit 110 shown in FIG. 12, the recording apparatus shown in FIGS. 17 to 19, and the recording apparatus shown in FIGS. 20 to 22 will be briefly described below.

In printing head 90 shown in FIGS. 8 and 9, a plurality of nozzle grooves 100 and ink holding recess portion 102 of nozzle member 98, which abuts against heating means support member 96, face a plurality of heating means 92 and the opening of ink supply pipe 94 of heating means support member 96. Ink, which is supplied from ink supply pipe 94 and is filled in nozzle grooves 100 through recess portion 102, is injected therefrom by the pressure of bubbles formed in the ink upon heating of heating means 92.

Therefore, when a drive pulse is applied from a control circuit (not shown) to desired heating means 92, ink in nozzle grooves 100 corresponding to desired heating means 92 is injected from the front end face of printing head 90, and a desired pattern corresponding to the arrangement of desired heating means 92 can be printed on a recording paper sheet arranged in front of the front end face of printing head 90.

In improved printing head 90 shown in FIGS. 10 and 11, the front end faces of nozzle member 98 and heating means support member 96 are arcuated inwardly along the outer peripheral surface of the platen, and a plurality of heating means 92 and a plurality of nozzle grooves 100 are arranged along the arcuated front end faces. Therefore, when improved printing head 90 is moved along the longitudinal direction of the platen, a relatively wide range of printing in the peripheral direction of the platen can be performed.

In printing head 90 shown in FIG. 12, when nozzle grooves 100 of nozzle member 98 are deformed after long periods of operation of printing head 90, moving member 124 can be drawn upward from guide rod 116. Thus, only nozzle member 98 can be replaced, and support member 96 need not be replaced.

In the four multi-color recording apparatus shown in FIGS. 17 to 19, a given drive pulse is applied to respective heating means 92 of a pair of printing head units 110 while slidable frame 154 is reciprocally moved along a pair of stationary shafts 152. As a result, a desired color ink is injected onto a recording paper sheet (not shown) on platen 168 from printing head 90 having heating means 92 corresponding to the drive pulse, thereby performing a desired color printing operation. During the above-mentioned printing operation, when reciprocal shaft 140 is reciprocally moved in the vertical direction indicated by arrow D, moving member 124 is vertically moved through horizontal rod 196. As a result, ink filled in nozzle grooves 100 of nozzle member 98 fixed to moving member 124 can be prevented from clogging.

The printing operation of the four multi-color recording apparatus shown in FIGS. 20 to 22 is the same as that of the four multi-color recording apparatus described above. However, in the recording apparatus shown in FIGS. 20 to 22, the vertical movement (indicated by arrow D) of reciprocal shaft 190 causes a reciprocal arcuated movement of moving member 214 having nozzle member 98 in the direction indicated by arrow E. As a result, ink filled in nozzle grooves 100 of nozzle member 98 fixed to moving member 124 can be prevented from clogging.

In the various printing heads, printing head units, and recording apparatuses shown in FIGS. 8 to 22, the following technical advantages can be provided.

(1) Since the nozzle member having a plurality of nozzle grooves is reciprocally moved relative to the heating means support member, ink clogging in the nozzle grooves can be eliminated.

(2) Since a plurality of nozzle grooves (corresponding to nozzle holes) correspond to a single heating means, even if one nozzle groove clogs with ink, a blank dot (a portion no ink attached) will not be formed in ink dots formed on recording paper by the single heating means.

(3) Even if bubbles remain in the nozzle groove or even if ink clogging occurs, since the position of the nozzle groove of interest relative to the heating means is always changed, idle heating of the heating means can be prevented, and hence, the heating means can be prevented from being damaged.

(4) If the nozzle grooves are deformed over long periods of use of the printing head, the moving member can be replaced, and only the nozzle member can be easily replaced. The heating means support member need not be replaced.

(5) Since the nozzle member is urged against the heating means support member, ink leakage from the ink holding recess portion and the nozzle grooves excluding injection ports can be prevented. In addition, replacement of the nozzle member can be facilitated.

(6) Since two printing heads can be arranged in a single printing head unit, if a multi-color or fullcolor recording apparatus is arranged, the outer dimension of the recording apparatus can be reduced.

Figure 23:
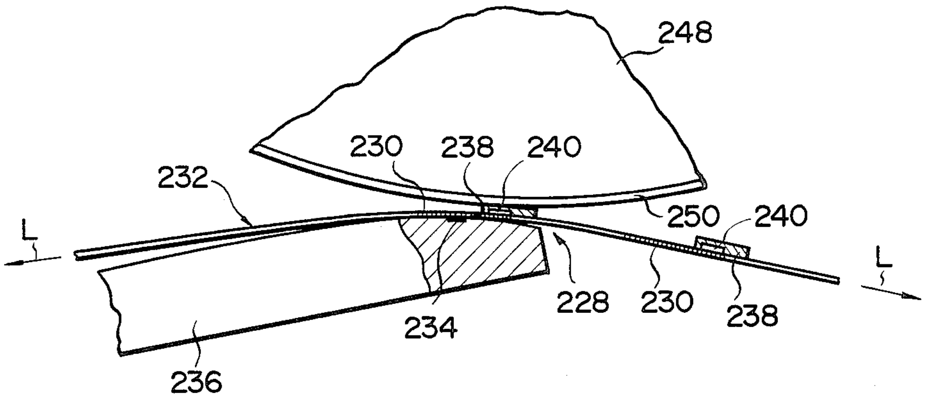
FIG. 23 is a side view schematically showing a printing head used in a recording apparatus capable of achieving the detailed second object of the present invention, wherein a recording paper sheet wound around a platen is in contact with a spacer member of the printing head.
Figure 24:
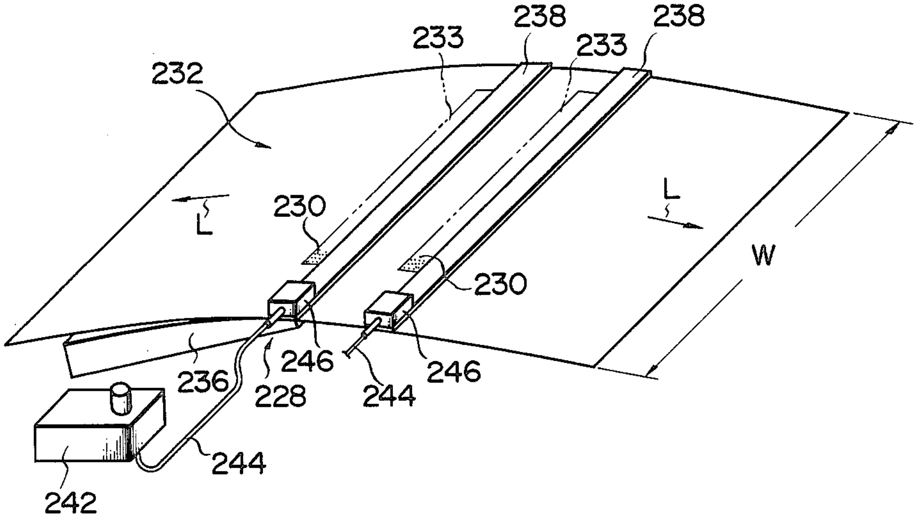
FIG. 24 is a perspective view schematically showing the printing head shown in FIG. 23.

FIGS. 23 to 38 show various embodiments of various recording apparatuses and printing heads used therein that can achieve the detailed second object of the present invention. Printing head 228 shown in FIGS. 23 and 24 comprises film member 232 which has a large number of nozzle holes 230 having a diameter of 0.01 mm to 0.02 (preferably 0.02 mm). Film member 232 is formed of a metal or resin having a heat resistance. A large number of nozzle holes 230 constitute a plurality of nozzle areas 233 which extend in the widthwise direction of film member 232 at a plurality of positions separated from each other in the longitudinal direction thereof (indicated by arrow L).

A portion of the upper surface of heating means support member 236 having a large number of heating means 234 is in contact with the lower surface of film member 232. Support member 236 is fixed to a base (not shown). A large number of heating means 234 are arranged in a direction perpendicular to the longitudinal direction of film member 232 (indicated by arrow L) on the portion of the upper surface of support member 236.

Film member 232 is supported while being urged by a pair of rollers (not shown) in the longitudinal direction indicated by arrow L. A plurality of spacer members 238 having the same length as width W of film member 232 are provided on the upper surface of film member 232, and extend in the widthwise direction of film member 232 along one side of nozzle areas 233 thereabove. Recess portion 240 is formed on the surface of each spacer member 238, which is contact with film member 232. Recess portion 240 extends in the longitudinal direction of spacer member 238. Ink is supplied from ink tank 242 to corresponding recess portion 240 through corresponding ink supply pipe 244 and connector 246. Ink to be supplied to nozzle holes 230 of neighboring nozzle areas 233 is held in recess portion 240 of each spacer member 238.

Spacer member 238 consists of a 0.2-mm thick film which is formed of a metal or resin material and has a flexibility.

Recording paper sheet 250, which is wound around the peripheral surface of platen 248 arranged above support member 236, is in contact with the upper surface of spacer members 238. A distance between recording paper sheet 250 and the upper surface of film member 232 is accurately maintained to be 0.2 mm by spacer members 238. Therefore, ink which is leaked from nozzle holes 230 and becomes attached to the outer surface of film member 232 can be prevented from being attached to recording paper sheet 250, and paper sheet 250 can be prevented from being contaminated with ink.

In the above-mentioned printing head, spacer members 238 are fixed to film member 232, and film member 232 is reciprocally moved in the longitudinal direction indicated by arrow L by a reciprocal drive means (not shown).

When film member 232 is reciprocally moved in the longitudinal direction indicated by arrow L by a 1-mm stroke together with spacer members 238, ink in holding recess portion 240 moves through a wedge-shaped gap formed between film member 232 and the upper surface of support member 236 along the two sides of heating means 234 by capillarity and is collected on the two sides of heating means 234. Then, the ink is supplied into nozzle holes 230 passing the two sides. When desired heating means 234 are heated in response to a drive signal from a control circuit (not shown), ink in nozzle holes 230 is injected by the pressure of bubbles formed in the ink in nozzle holes corresponding to desired heating means 234, thereby performing a printing operation on recording paper sheet 250.

Ink from ink holding recess portion 240 is continuously supplied to a region of the lower surface of film member 232, on which a large number of nozzle holes 230 are formed, by a pump effect occurring when nozzle holes 230, subjected to ink injection, draw ink.

After one of a plurality of nozzle areas 233 is used for a predetermined period of time, film member 232 is moved in one longitudinal direction indicated by arrow L, so that new nozzle area 233 is arranged above heating means 234. A printing operation can be performed using new nozzle area 233. Therefore, a clear printing operation can always be performed.

Figure 26:
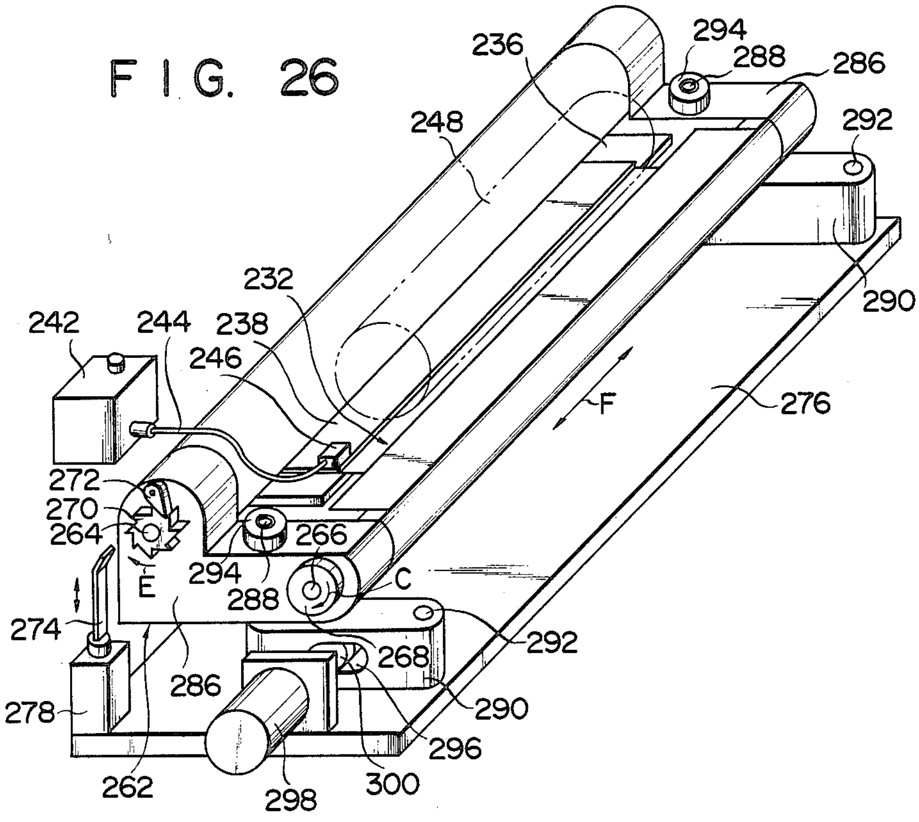
FIG. 26 is a perspective view schematically showing the recording apparatus shown in FIG. 25.

FIGS. 25 and 26 show a recording apparatus having printing head 260 using planar heating means support member 236 having a flat upper surface. The same reference numerals in FIGS. 25 and 26 denote the same parts as in printing head 228 shown in FIGS. 23 and 24, and a detailed description thereof will be omitted. In this recording apparatus, film member 232 is housed in cassette casing 262, and spacer member 238 is mounted on cassette casing 262. Film member 232 having a plurality of nozzle areas 233 is wound around takeup roller 264 and feed roller 266 which are rotatably supported to be parallel to each other and to be separated at a distance inside cassette casing 262. Feed roller 266 is urged clockwise (indicated by arrow C) by a torsion spring in torsion spring casing 268 arranged on the outer surface of cassette casing 262. Takeup roller 264 is fixed to ratchet gear 270 at a position outside the outer surface of cassette casing 262. Ratchet gear 270 is engaged with ratchet pawl 272 arranged on the outer surface of cassette casing 262. Film member 232 is extended between takeup roller 264 and feed roller 266 by the urging force of the torsion spring of feed roller 266. Ratchet gear drive lever 274 is coupled to a plunger of plunger/-solenoid drive means 278. Means 278 is fixed to base 276, which is located below cassette casing 262. When ratchet gear drive lever 274 driven by drive means 278 rotates ratchet gear 270 clockwise indicated by arrow E, film member 232 is taken up by takeup roller 264 by a predetermined length, and new nozzle area 233 faces a plurality of heating means 234 of support member 236.

In this recording apparatus, spacer member 238 extends in the longitudinal direction of film member 232 to be separated apart from recess portion 240, and extending end 280 in the longitudinal direction is fixed to cassette casing 262. Ink holding recess portion 240 is slightly separated apart from heating means 234 in the longitudinal direction of film member 232.

Recording paper sheet 250, wound around platen 248, is brought into contact with the upper surface of spacer member 238 near the ink holding recess portion. Platen 248 is rotatably arranged at the other end portion of platen lever 284, one end portion 282 of which is coupled to a stationary support member (not shown) to be rotatable in the vertical direction.

Pins 288 rotatably extend through two side portions 286 of cassette casing 262 in the vertical direction. The lower end of each pin 288 is coupled to one end portion of corresponding right-and-left direction swing lever 290, which is arranged on base 276. The other end portion of each swing lever 290 is rotatably coupled to stationary pin 292 on base 276 so as to be swingable in the widthwise direction of film member 232 (i.e., in the longitudinal direction of platen 248). Nut 294 is threadably engaged with the upper end of each pin 288 extending from the upper wall of each side portion 286 of cassette casing 262. Cassette casing 262 can be easily detached to or removed from pins 288 of levers 290, such that nuts 294 are detached to or removed from the upper ends of pins 288. Hole 296 is formed at the center of one of swing levers 290, and receives grooved cam 300. Cam 300 is fixed to the output shaft of drive motor 298, fixed to base 276. The pin of lever 290, which projects inside hole 296, is engaged with the cam groove on the outer peripheral surface of grooved cam 300.

Therefore, rotation of drive motor 298 causes swing movement of levers 290 in the right-and-left direction (i.e., the widthwise direction of film member 232 and the longitudinal direction of platen 248), and hence, causes a reciprocal movement of cassette casing 262 in the same direction as above (indicated by arrow F).

In this embodiment as described above, drive motor 298 with the grooved cam and swing levers 290 constitute a reciprocal drive means for cassette casing 262, and hence, for film member 232 and spacer member 238.

The reciprocal movement of cassette casing 262 in the direction indicated by arrow F causes reciprocal movement of film member 232 and spacer member 238 relative to heating means 234 on support member 236 in the direction indicated by arrow F. Therefore, ink from ink holding recess portion 240 can be reliably supplied to all the nozzle holes of nozzle area 233 adjacent to recess portion 240.

Figure 27:
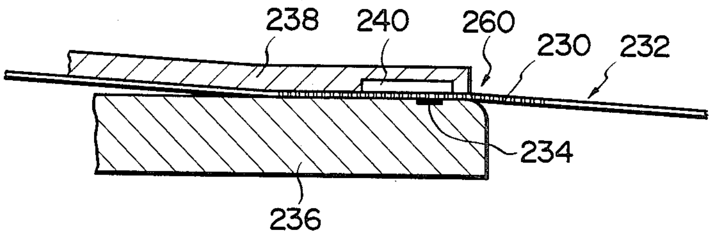
FIG. 27 is a longitudinal sectional view schematically showing the positional relationship between a heating means support member and a nozzle member of the printing head when no printing operation is performed for a relatively long period of time in the recording apparatus shown in FIG. 26.

FIG. 27 shows a state of printing head 260 when the recording apparatus shown in FIGS. 25 and 26 is inoperative for long periods. When swing levers 290 are largely rotated in one direction, cassette casing 262 can be moved by a large distance in a direction perpendicular to the direction indicated by arrow F until ink holding recess portion 240 of spacer member 238 is located above heating means 234, as shown in FIG. 27. Recess portion 240 located above heating means 234 can prevent nozzle holes 230 near heating means 234 from being dried. Therefore, when the printing operation is restarted, ink does not clog in nozzle holes 230, and a poor printing operation can be prevented.

Figure 28:
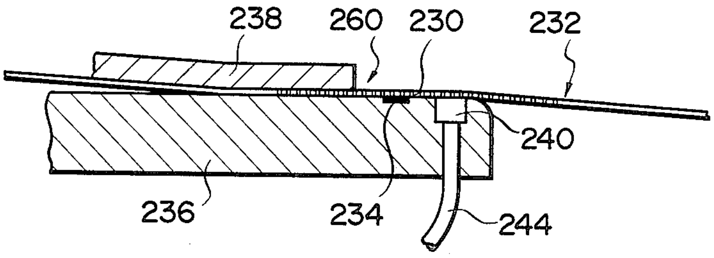
FIG. 28 is a longitudinal sectional view, similar to FIG. 27, showing a first modification of the printing head used in the recording apparatus shown in FIG. 26.

FIG. 28 shows a first modification of printing head 260 used in the recording apparatus shown in FIGS. 25 and 26. In this modification, recess portion 240 is formed near a plurality of heating means 234 on heating means support member 236. Ink supply pipe 244 extends from the lower surface of recess portion 240.

Figure 29:
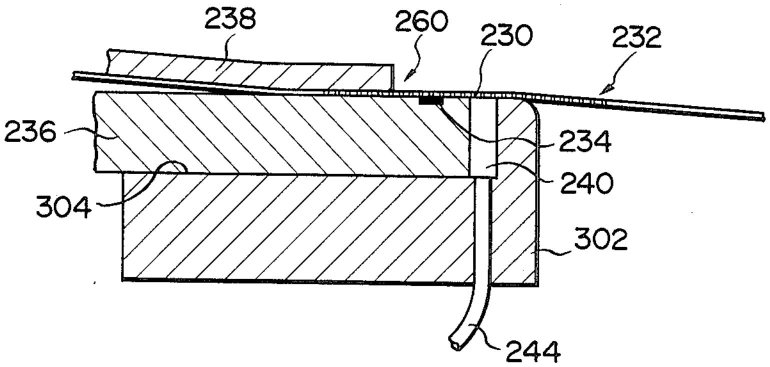
FIG. 29 is a longitudinal sectional view, similar to FIG. 27, showing a second modification of the printing head used in the recording apparatus shown in FIG. 26.

FIG. 29 shows a second modification of printing head 260 used in the recording apparatus shown in FIGS. 25 and 26. In this modification, heating means support member 236 is detachably mounted in positioning recess portion 304 on the upper surface of positioning member 302 fixed to base 276. Recess portion 240 is constituted by a gap defined between the end face of support member 236 and the side surface of recess portion 304.

Figure 30:
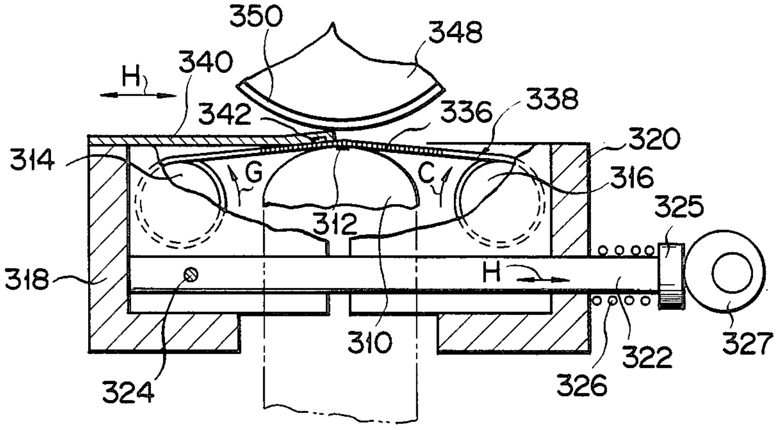
FIG. 30 is a cross-sectional view schematically showing another embodiment of a recording apparatus capable of achieving the detailed second object of the present invention.
Figure 31:
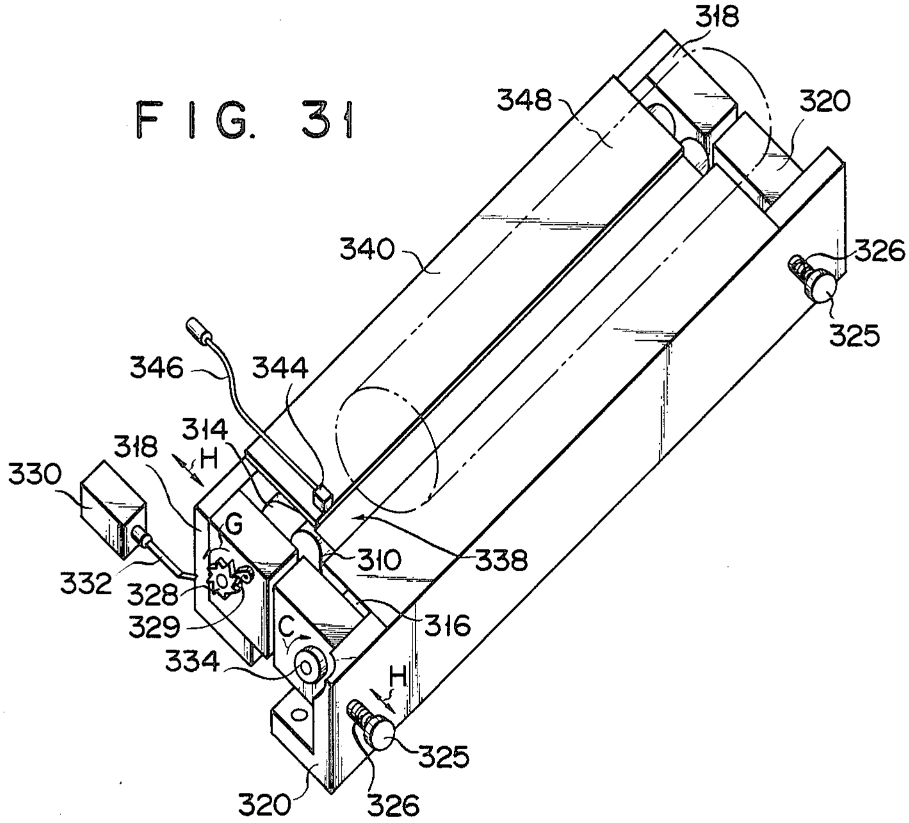
FIG. 31 is a perspective view schematically showing the recording apparatus shown in FIG. 30.
Figure 32:
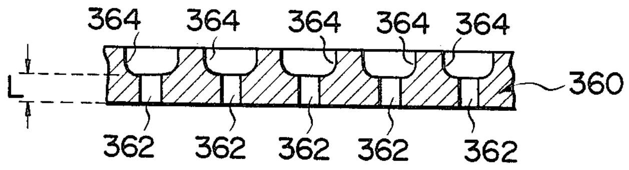
FIGS. 32 and 33 are respectively a longitudinal sectional view and a plan view schematically showing a first modification of the film member used in the various recording apparatuses and printing heads shown in FIGS. 23 to 31.
Figure 33:
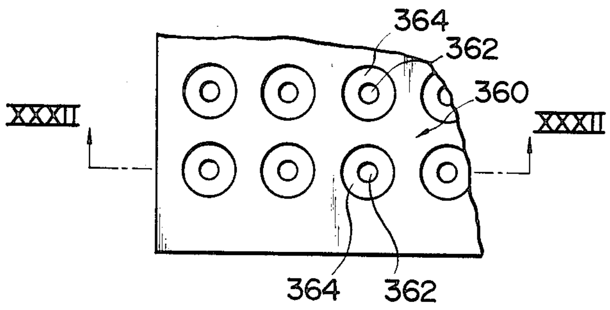
Figure 34:
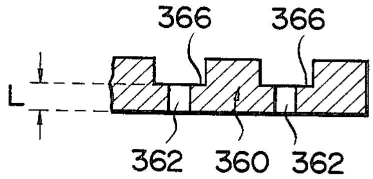
FIG. 34 and 35 are respectively a cross-sectional view and a plan view schematically showing a second modification of the film member used in the various recording apparatuses and printing heads shown in FIGS. 23 to 31.
Figure 35:
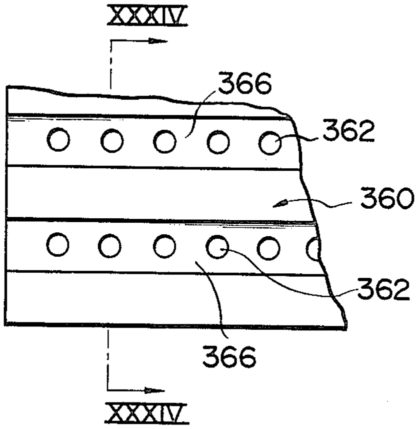

FIGS. 30 and 31 show another embodiment of a recording apparatus that can achieve the detailed second object of the present invention. In this embodiment, heating means support member 310 has an outwardly arcuated upper end face, and has a flat shape extending in a direction perpendicular to a paper surface in FIG. 30 and in the vertical direction. A plurality of heating means 312 are aligned in line on the top portion of the upper end face of support member 310 in the direction perpendicular to the paper surface in FIG. 30. A set of takeup roller 314 and feed roller 316, which extend along the two side surfaces of support member 310, are arranged on the two sides of support member 310. Rollers 314 and 316 are rotatably supported by first and second cassette case members 318 and 320, respectively. Case members 318 and 320 are arranged on two sides of support member 310. Second cassette case member 320 and support member 310 are fixed to a base (not shown). First cassette case member 318 extends through second cassette case member 320 outside the end faces of rollers 314 and 316, and is coupled to one end portion of each of reciprocal shafts 322 extending in the right-and-left direction in FIG. 30. The other end portion of each reciprocal shaft 322 extending from second cassette case member 320 is fixed to corresponding cam follower 325. Compression spring 326 is wound around each reciprocal shaft 322 between cam follower 325 and member 320. Cam 327 is fixed to the output shaft of a reciprocal drive motor (not shown) arranged on a base (not shown) and abuts against cam follower 325. The shaft of takeup roller 314 is fixed to ratchet gear 328. Ratchet pawl 329 is arranged on the outer surface of first cassette case member 318 and is cooperated with ratchet gear 328. Ratchet drive lever 332 is coupled to a plunger of plunger/solenoid drive means 330, fixed to the base (not shown), and is arranged near ratchet gear 328. The shaft of feed roller 316 is coupled to a torsion spring housed in torsion spring casing 334 fixed to the outer surface of second cassette casing 320. The torsion spring urges feed roller 316 clockwise, as indicated by arrow C. Film member 338 having a large number of nozzle holes 336 is wound around rollers 314 and 316, and is extended between rollers 314 and 316 by the urging force of torsion spring of roller 316. When ratchet gear 328 is rotated clockwise by plunger/-solenoid drive means 330, as indicated by arrow G, film member 338 can be taken up from feed roller 316 to takeup roller 314. As a result, nozzle holes 336 after being used for a predetermined period of time can be moved from the above of a plurality of heating means 312. At the same time, nonused nozzle holes 336 can be positioned above heating means 312.

In this recording apparatus, spacer member 340 having a predetermined thickness is in contact with the upper surface of film member 338. Spacer member 340 extends from near heating means 312 toward first cassette case member 318, and is fixed to member 318. Ink holding recess portion 342, which extends in the alignment direction of heating means 312, is formed on the lower surface of spacer member 340 near heating means 312. Ink is supplied from an ink tank (not shown) to ink holding recess portion 342 through connector 344 and ink supply pipe 346 coupled to connector 344. Spacer member 340 is formed of a material having an elasticity, and is urged against film member 338. Recording paper sheet 350 wound around platen 348 is in contact with a region of the upper surface of spacer member 340 corresponding to ink holding recess portion 342.

In the recording apparatus described above, when cam 327 is rotated in one direction during the printing operation, reciprocal shafts 322 are reciprocally moved by a predetermined stroke in longitudinal direction H (i.e., a direction perpendicular to the longitudinal direction of rollers 314 and 316). Therefore, first cassette case member 318 is also reciprocally moved in a direction indicated by arrow H together with spacer member 340 and film member 338. Ink from recess portion 342 is collected on two sides of heating means in a gap between the upper end face of support member 310 and film member 338 due to the above-mentioned wedge effect and a suction effect of empty nozzle holes 336, thereby reliably refilling ink to a plurality of nozzle holes 336 corresponding to a plurality of heating means 312. This can guarantee a satisfactory printing operation. Ink leaked on the upper surface of film member 338 can be prevented from becoming attached to recording paper sheet 350 by means of spacer member 340.

FIGS. 32 and 33 and FIGS. 34 and 35 respectively show first and second modifications of the film member used in various recording apparatuses and printing heads shown in FIGS. 23 to 31. In the first modification of the film member shown in FIGS. 32 and 33, counter bores 364 are concentrically formed on nozzle holes 362 on the upper surface of film member 360. In the second modification shown in FIG. 34 and 35, a plurality of grooves 366 having a larger width than a diameter of nozzle hole 362 are formed along a plurality of nozzle hole arrays 362 on the upper surface of film member 360.

In the first and second modifications, when virtual length L of nozzle hole 362 (i.e., a distance from the bottom surface of counter bore 364 or groove 366 to the lower surface of film member 360) is set to be 0.02 mm which is best suited for ink ejection, the thickness of film member 360 can be larger than 0.02 mm. Therefore, the mechanical strength of film member 360 can be improved. Ink leaked from the lower surface side to the upper surface side of film member 360 via nozzle holes 362 is held in counter bores 364 or grooves 366. Even when the recording paper sheet is in contact with the upper surface of film member 360, no ink becomes attached to the sheet.

Figure 36:
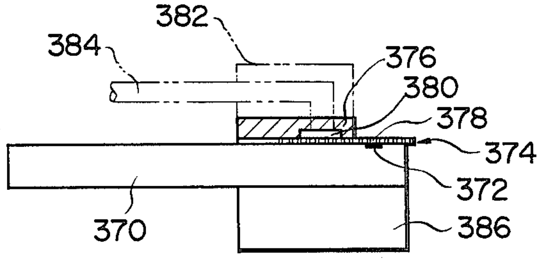
FIG. 36 is a cross-sectional view schematically showing still another embodiment of a recording apparatus capable of achieving the detailed second object of the present invention.
Figure 37:
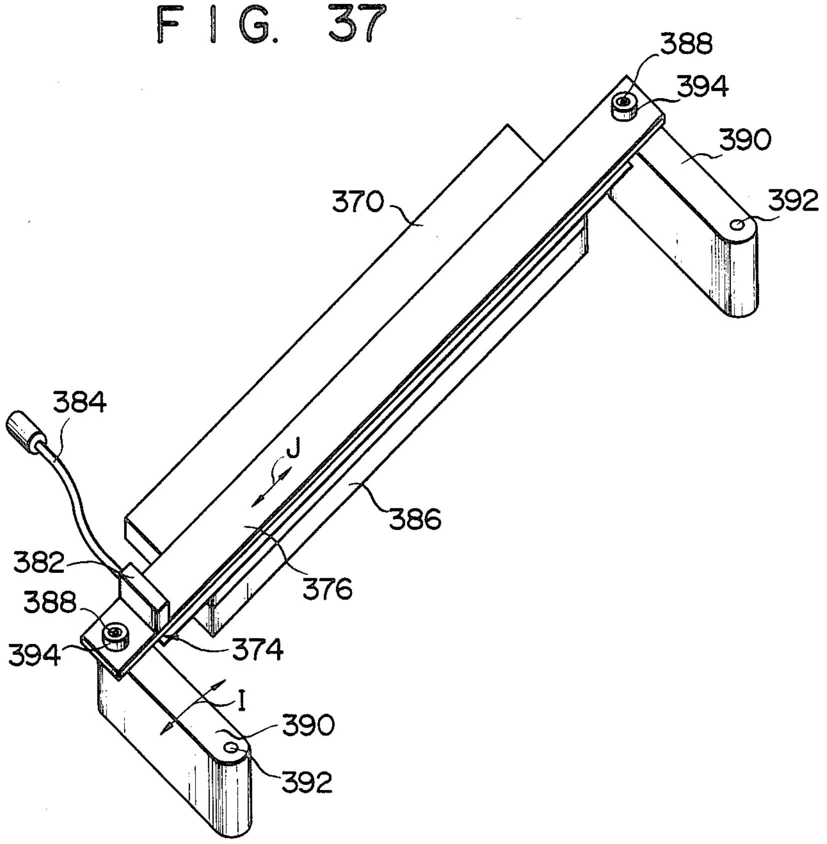
FIG. 37 is a perspective view schematically showing the recording apparatus shown in FIG. 36.
Figure 38:
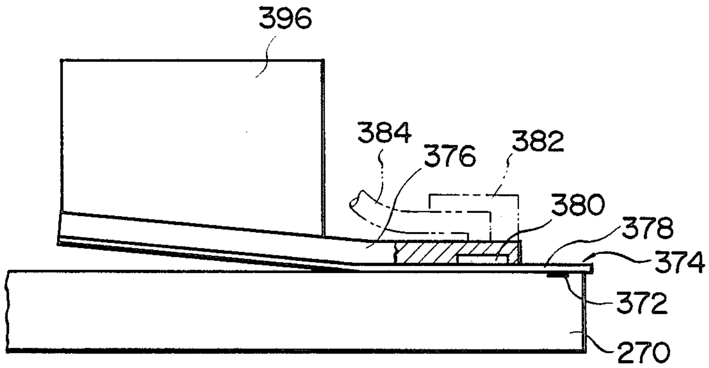
FIG. 38 is a cross-sectional view showing still another embodiment of a recording apparatus capable of achieving the detailed second object of the present invention.

FIGS. 36 and 37 show still another embodiment of a recording apparatus that can achieve the detailed second object of the present invention. In this embodiment, heating means support member 370 has a flat rectangular shape. A plurality of heating means 372 are arranged along one side of the upper surface of member 370. In this embodiment, film member 374 and spacer member 376 consist of magnetic materials. Film member 374 having a plurality of nozzle holes 378 extends on the surface of support member 370 along the one side thereof, and covers heating means 372. Spacer member 376 extends along the one side of support member 370 at a position slightly separated apart from heating means 372 on the upper surface of film member 374. Spacer member 376 has ink holding recess portion 380 extending along the one side of support member 370, on its lower surface. Ink is supplied from an ink tank (not shown) to ink holding recess portion 380 through connector 382 and ink supply pipe 384 connected to connector 382. Magnet 386 is arranged on the lower surface of support member 370 in correspondence with film member 374 and spacer member 376. Film member 374 and spacer member 376 are attracted on the upper surface of support member 370 by the magnetic force of magnet 386. Pins 388 vertically extend through the two end portions spacer member 376, and the lower end of each pin 388 is fixed to one end portion of corresponding right-to-left direction swing lever 390. The other end portion of lever 390 is fixed to stationary pin 392, fixed to a base (not shown), so as to be swingable in the right-and-left direction (extending direction of spacer member 371). Nut 394 is threadably engaged with the upper end of each pin 388 projecting from spacer member 376. When one of levers 390 is swinged in the right-and-left direction (indicated by arrow I) by a drive means (not shown), film member 374 and spacer member 376 are reciprocally moved in the longitudinal direction (indicated by arrow J) of the member 376 above support member 370. Then, ink is sufficiently supplied from ink holding recess portion 380 to all nozzle holes 378. FIG. 38 shows still another embodiment of a recording apparatus that can achieve the detailed second object of the present invention. In this embodiment, the same reference numerals in FIG. 38 denote the same parts as in the embodiment shown in FIGS. 36 and 37, and a detailed description thereof will be omitted. In this embodiment, spacer member 376 and film member 374 which overlap each other are formed of a material having an elasticity. End portions of members 376 and 374 further from ink holding recess portion 380 and nozzle holes 378 are separated upward from the upper surface of heating means support member 270, and are fixed to arm member 396. Therefore, the end portions of film member 374 and spacer member 376 on which ink holding recess portion 380 and nozzle holes 378 are formed are elastically urged against near heating means 372 of support member 270. Arm member 396 is reciprocally moved in a direction perpendicular to a sheet surface by a reciprocal drive means (not shown), and sufficiently supplies ink from ink holding recess portion 380 to all nozzle holes 378.

Since a plurality of nozzle holes of the film member used in various recording apparatuses and printing heads correspond to each heating means, even if any of nozzle holes corresponding to a single heating means clogs, a blank dot (a portion with no ink) will not be formed in a pattern formed on a recording paper sheet in correspondence to the single heating means.

Various recording apparatuses and printing heads shown in FIGS. 23 to 38 can provide the following technical advantages.

(1) Since the film member and the spacer member are reciprocally moved relative to the heating means support member during the printing operation, ink can be sufficiently supplied from the ink holding recess portion to all the nozzle holes through a gap between the film member and the heating means support member. As a result, a printing operation free from a blank dot or blurring caused by ink shortage can be performed.

(2) Since a predetermined distance between a recording paper sheet and the film member can be maintained by the spacer member on the film member, ink leaked onto the film member through nozzle holes can be prevented from being attached to a recording paper sheet. As a result, a clear printing operation can be performed without contamination.

(3) Since the film member, the spacer member, and the like can be housed in a cassette, the maintenance of the recording apparatus can be facilitated.

(4) When the nozzle holes, used in correspondence with the heating means, are degraded or damaged, the film member can be moved, so that nonused nozzle holes can face the heating means. As a result, a clear printing operation can always be performed.

(5) When hydrophobic coating is made on the upper surface of the film member, ink attachment onto the upper surface of the film member can be prevented.

Figure 39:
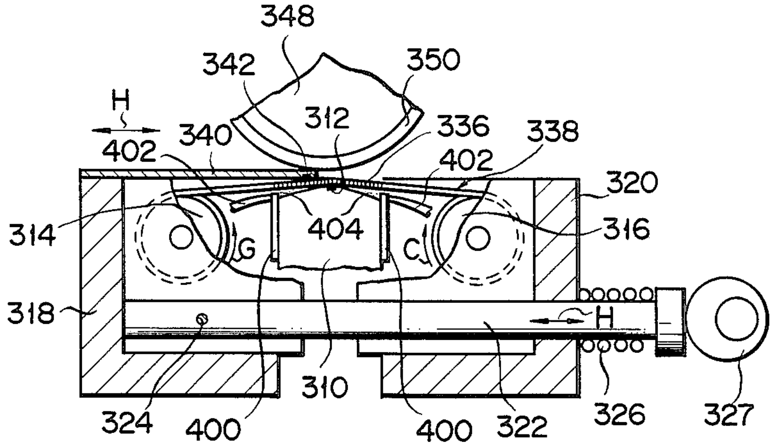
FIG. 39 is a longitudinal sectional view schematically showing a recording apparatus capable of achieving the detailed third object of the present invention.
Figure 40:
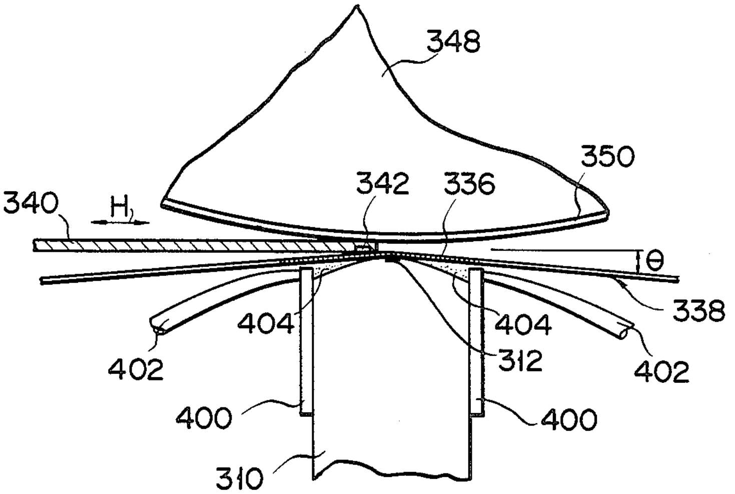
FIG. 40 is an enlarged view schematically showing a printing head and its peripheral components of the recording apparatus shown in FIG. 39.
Figure 41:
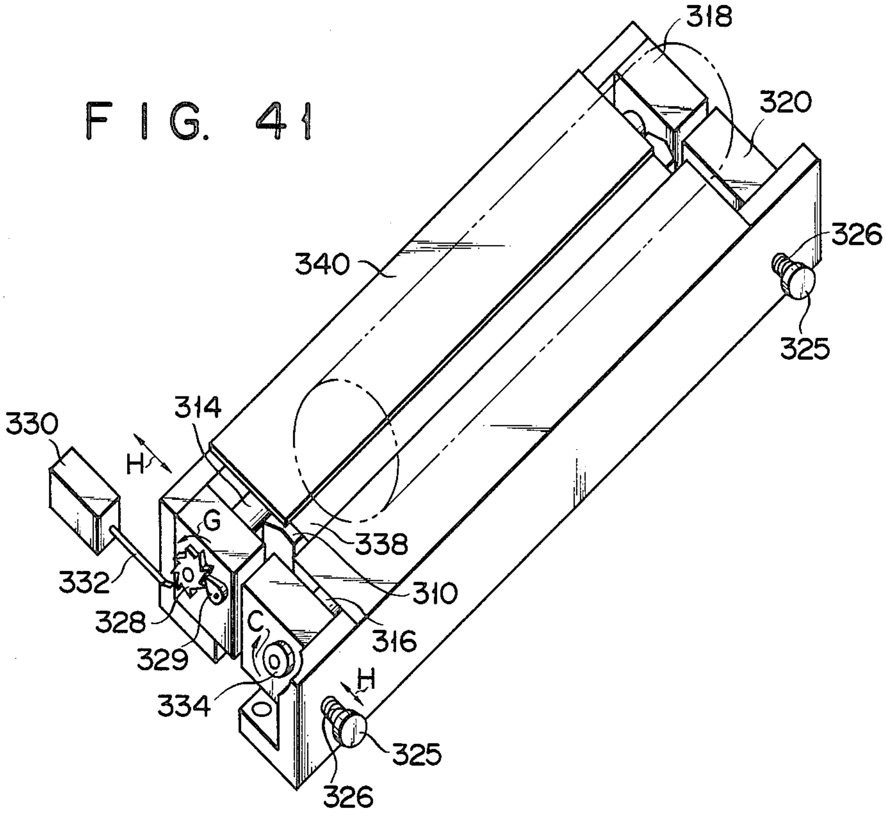
FIG. 41 is a perspective view schematically showing the recording apparatus shown in FIG. 39.

FIGS. 39 to 41 show a recording apparatus for achieving the detailed third object of the present invention. This recording apparatus is of an improved type of the recording apparatus for achieving the detailed second object of the present invention. Therefore, the same reference numerals used in this recording apparatus denote the same parts as in the latter recording apparatus, and a detailed description thereof will be omitted.

In this improved recording apparatus, ink holding walls 400 are fixed to two end faces of two side surfaces in the longitudinal direction of heating means support member 310. Each wall 400 projects upward from a crossing position between the two side surfaces and the arcuated upper end face. The upper end of wall 400 is slightly lower than the top portion of the upward arcuated upper end face of support member 310. Ink supply pipes 402 from an ink tank (not shown) are open to ink holding walls 400 on two sides of heating means 312, so that ink from the ink tank (not shown) is stored in wedge-shaped ink storage gaps 404 extending from heating means 312 to ink holding walls 400 between the upper end face of support member 310 and film member 338 on two sides of heating means 312.

Ink from ink storage gaps 404 is supplied through nozzle holes 336 into ink holding recess portion 342 formed on the lower surface of spacer member 340. Spacer member 340 has an elasticity and is in contact with the upper surface of film member 338 near heating means 312, and an ink film is formed between the lower surface of spacer member 340 and the upper surface of film member 338.

Note that contact angle 8 of film member 338 shown in FIG. 40 is set at about 2 to 6 degrees.

The operation of the improved recording apparatus having the above arrangement will be described.

Figure 42:
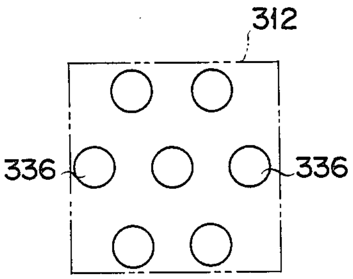
FIG. 42 is a plan view schematically showing the arrangement pattern of a plurality of nozzle holes corresponding to one of a plurality of heating means of the printing head of the recording apparatus shown in FIG. 39.

When cam 327 is rotated in one direction and reciprocal shaft 322 is reciprocated in the longitudinal direction indicated by arrow H, first cassette case member 318 is reciprocally moved in the direction indicated by arrow H by a stroke of 0.1 to 1.0 mm. As a result, ink 10 in ink storage gaps 404 is concentrated toward heating means 312 by a pump effect due to an ink suction effect of empty nozzle holes 336 subjected to ink injection, and is supplied to nozzle holes 336 near heating means 312. When a given drive signal is supplied to heating means 312 during this interval, ink in nozzle holes 312 corresponding to heating means 312 receiving the drive signal is heated, and is injected outside from nozzle holes 312 by a pressure of bubbles generated in the heated ink, thereby performing a printing operation onto recording paper sheet 350. Heat generated by heating means 312 causes not only ink injection from nozzle holes 336 arranged in the plane of heated heating means 312 (i.e., corresponding to heating means), as shown in FIG. 42, but also ink injection from nozzle holes 316 adjacent to the plane of heated heating element 312. Ink is immediately refilled in nozzle hole 316 subjected to ink injection, before heating means 312 corresponding to this nozzle hole 336 loses a heat energy enough to generate bubbles, due to ink suction by nozzle holes 336 subjected to ink injection and a pressure loaded to ink in gaps 404. Therefore, ink can be injected again from above nozzle holes 336.

Figure 43:
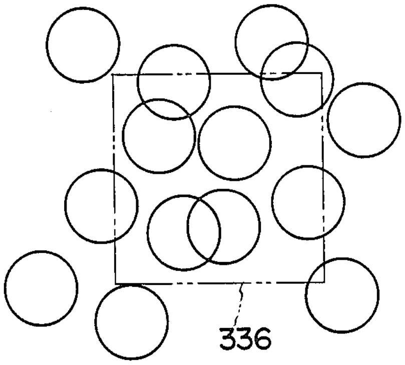
FIG. 43 is a plan view schematically showing an ink pattern obtained such that ink continuously injected twice from the plurality of nozzle holes shown in FIG. 42 becomes attached to a recording paper sheet.
Figure 44:
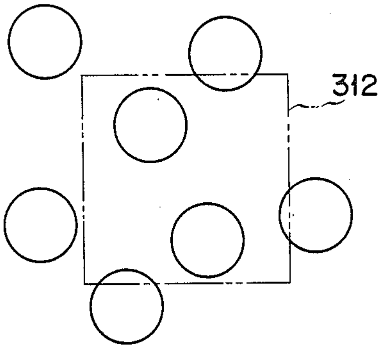
FIG. 44 is a plan view schematically showing an ink pattern obtained such that ink injected once from the plurality of nozzle holes shown in FIG. 42 becomes attached to a recording paper sheet.
Figure 45:
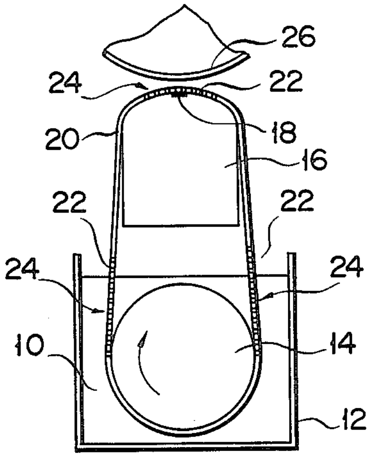
FIG. 45 is a side view schematically showing a recording apparatus comprising a conventional ink-jet type printing head.

FIG. 43 shows an ink pattern obtained on a recording sheet by continuous double ink injection from seven nozzle holes 336 shown in FIG. 42. FIG. 44 shows an ink pattern obtained on a recording sheet by single ink injection from seven nozzle holes 336 shown in FIG. 42. From the comparison between FIGS. 43 and 44, it is revealed that the ink pattern obtained by double ink injection has a higher printing density per unit area than that of the ink pattern obtained by single ink injection.

Since ink injected from nozzle holes 312 randomly flies, the ink patterns shown in FIGS. 43 and 44 cannot accurately correspond to the arrangement pattern of a plurality of nozzle holes 312 corresponding to single heating means 312, shown in FIG. 42. In addition, the ink patterns shown in FIGS. 43 and 44 cannot accurately correspond to each other.

The improved recording apparatus shown in FIGS. 39 to 41 can provide the following technical advantages.

(1) Since the film member is urged against the heating means support member by the spacer member and ink is always supplied between the upper end face of the heating means support member and the film member, a plurality of nozzle holes corresponding to a single heating means can inject ink a plurality of times upon a one-shot pulse drive signal to the single heating means. Therefore, since ink dots more than the number of nozzle holes can be obtained, the printing density can be greatly improved.

(2) Since ink can always be filled in a gap between the upper end face of the heating means support member and the film member, ink supply to the nozzle holes can be quickly and efficiently performed. Therefore, since ink can be immediately supplied to nozzle holes subjected to ink injection, a plurality of nozzle holes corresponding to a single heating means receiving one-shot pulse drive signal can continuously inject ink.

What is claimed is:

1. A recording apparatus having a printing head, comprising:
- a heating means support member having a plurality of heating means;
- a film member which is in contact with said heating means support member to face said plurality of heating means and has a plurality of nozzle holes on a region facing said heating means;
- an ink holding portion, arranged near said plurality of nozzle holes and on one of opposing surfaces of said film member and said heating means support member, for holding externally supplied ink; and
- vibration generating means for vibrating said heating means support member to supply ink to said plurality of nozzle holes from said ink holding portion through a gap between the opposing surfaces of said film member and said heating means support member.

2. An apparatus according to claim 1, wherein said ink holding portion is arranged on the opposing surface of said heating means support member.

3. An apparatus according to claim 1, wherein said ink holding portion is arranged on the opposing surface of said film member.

4. An apparatus according to claim 1, wherein said plurality of nozzle holes provided to the region of said film member facing said heating means constitute one nozzle group.

5. An apparatus according to claim 4, wherein said ink holding portion is arranged on a region of said film member on which said nozzle group is not formed.

6. An apparatus according to claim 4, wherein an area of said nozzle group is larger than a total area of said plurality of heating means on said heating means support member.

7. An apparatus according to claim 4, wherein said film member further has a plurality of another nozzle groups.

8. An apparatus according to claim 1, wherein said vibration generating means has a piezoelectric member.

9. A recording apparatus having a printing head, comprising:
- a heating means support member having a plurality of heating means which are aligned in line;

a nozzle member which is in contact with said heating means support member to face said plurality of heating means, has a plurality of nozzle grooves, which are open to its end face, on a region facing said heating means, and is movable in the alignment direction of said plurality of heating means;

nozzle member drive means for reciprocally moving said nozzle member in the alignment direction; and ink supply means for supplying ink to said plurality of nozzle grooves.

10. An apparatus according to claim 9, further comprising:

a base having a guide rod, extending in the alignment direction of said plurality of heating means, for supporting said heating means support member; and a moving member, having a guide hole in which said guide rod of said base is inserted, for supporting said nozzle member, and wherein said nozzle member drive means reciprocally moves said moving member relative to said guide rod of said base, so as to reciprocally move said nozzle member in the alignment direction.

11. An apparatus according to claim 9, further comprising:

another heating means support member arranged to face said heating means support member, another nozzle member corresponding to said another heating means support member, a moving member, movable in the alignment direction, for supporting said two nozzle members, and urging means, arranged on said moving member, for urging said two nozzle members toward said two heating means support members, and wherein said nozzle member drive means reciprocally moves said moving member in the alignment direction, so as to reciprocally move said two nozzle members in the alignment direction, and said plurality of heating means of said heating means support member and a plurality of heating means of said another heating means support member are formed on opposing surfaces of said heating means support member and said another heating means support member.

12. An apparatus according to claim 11, wherein said urging means comprises a substantially U-shaped leaf spring, which is fixed to said moving member at its central portion and urges said two nozzle members by its two end portions toward said two heating means support members.

13. An apparatus according to claim 11, wherein said urging means is fixed to said moving member and is formed of a rubber-like elastic material.

14. An apparatus according to claim 9, further comprising:

a cylindrical platen, arranged to face the end face of said nozzle member, for supporting a recording paper sheet, and wherein at least one of the end face of said nozzle member and the end face of said heating means support member corresponding to the end face of said nozzle member is arcuated inwardly along the outer peripheral surface of said platen.

15. A recording apparatus having a printing head, comprising:

a heating means support member having a plurality of heating means;

a film member which is in contact with said heating means support member to face said plurality of heating means, and has a plurality of nozzle holes on a region facing said heating means;

a spacer member which is in contact with said film member on a side opposite to said heating means support member, is arranged near said plurality of heating means of said heating means support member, and has a predetermined thickness;

reciprocal drive means for reciprocally moving said film member and said spacer member relative to said heating means support member; and ink supply means for supplying ink to said plurality of nozzle holes of said film member, and wherein said reciprocal drive means reciprocally moves said film member and said spacer member relative to said heating means support member, so as to reliably supply ink from said ink supply means to all of said plurality of nozzle holes of said film member, said plurality of heating means are selectively heated during the reciprocal movement, and ink ejected from the plurality of nozzle holes corresponding to the selected heating means is caused to become attached to a recording paper sheet, which is in contact with said spacer member and is separated from the surface of said film member by a predetermined distance by said spacer member, thereby performing a printing operation.

16. An apparatus according to claim 15, wherein said spacer member is fixed to a region of said film member on which said plurality of nozzle holes are formed, and said ink supply means comprises an ink holding recess portion, which is formed on a surface of said spacer member facing said film member and receives ink supply from an ink tank.

17. An apparatus according to claim 16, wherein said plurality of nozzle holes of said film member constitute a plurality of nozzle areas which extend in an alignment direction of said plurality of heating means of said heating means support member and are separated apart from each other in a direction perpendicular to the alignment direction, and said spacer member is fixed to said film member in correspondence with said plurality of said nozzle areas.

18. An apparatus according to claim 15, further comprising:

a cassette casing to which a pair of rollers are rotatably provided, and reciprocal drive means for reciprocally moving said cassette casing relative to said heating means support member, and wherein said film member is wound around said pair of rollers of said cassette casing, and said spacer member is fixed to said cassette casing.

19. An apparatus according to claim 15, wherein said ink supply means comprises an ink holding recess portion which is formed on a surface region of said heating means support member facing a region of said film member on which said plurality of nozzle holes are formed to be separated apart from said plurality of heating means, and receives ink supply from an ink tank.

20. An apparatus according to claim 19, further comprising:

a positioning means on which a positioning recess for detachably holding said heating means support member at a predetermined position is formed, and wherein said ink holding recess portion of said ink supply means is defined by a gap between an inner surface of said positioning recess and a side surface of said heating means support member.

21. An apparatus according to claim 18, wherein said cassette casing is reciprocally moved by said reciprocal drive means in a longitudinal direction of said pair of rollers.

22. An apparatus according to claim 18, wherein said cassette casing is reciprocally moved in a direction perpendicular to the longitudinal direction of said pair of rollers.

23. An apparatus according to claim 15, wherein a plurality of counter bores are formed on a surface of said film member against which said space member abuts, so as to be concentrical with said plurality of nozzle holes.

24. An apparatus according to claim 15, wherein a plurality of grooves having a width larger than a diameter of said nozzle holes are formed on a surface of said film member against which said space member abuts, and said plurality of nozzle holes are formed on bottom surfaces of said plurality of grooves along a line extending in the extending direction of said grooves, so as to be separated from each other.

25. An apparatus according to claim 15, wherein said film member and said spacer member are formed of a magnetic material, and a magnet for attracting said film member and said spacer member to said heating means support member is provided to said heating means support member.

26. An apparatus according to claim 15, wherein said film member and said spacer member are formed of a material having an elasticity, and said film member and said spacer member are urged against said heating means support member by selfelastic force.

27. A recording apparatus having a printing head, comprising:

a heating means support member having a plurality of heating means;

a film member which is in contact with said heating means support member to face said plurality of heating means, and has a plurality of nozzle holes on a region facing said heating means;

a spacer member which is in contact with said film member on a side opposite to said heating means support member, is arranged near said plurality of heating means of said heating means support member, and has a predetermined thickness;

reciprocal drive means for reciprocally moving said film member and said spacer member relative to said heating means support member;

ink supply means for supplying ink to a gap between said film member and said heating means support member; and ink storage means for storing the ink supplied from said ink supply means in the gap.

28. An apparatus according to claim 27, wherein said film member and said spacer member are formed of a material having an elasticity, and said film member and said spacer member are urged against said heating means support member by selfelastic force.

* * * * *